US011599946B2

(12) United States Patent
Yeh

(10) Patent No.: US 11,599,946 B2
(45) Date of Patent: Mar. 7, 2023

(54) ALGORITHMIC SYSTEM FOR DYNAMIC CONDITIONAL ASSET PRICING ANALYSIS AND FINANCIAL INTELLIGENCE TECHNOLOGY PLATFORM AUTOMATION

(71) Applicant: BRASS RING INTERNATIONAL DENSITY ENTERPRISE LIMITED, Hong Kong (CN)

(72) Inventor: Jia-Yuh Yeh, Taipei (TW)

(73) Assignee: Brass Ring International Density Enterprise Limited, Sheung Wan (HK)

(*) Notice: Subject to any disclaimer, the term of this patent is extended or adjusted under 35 U.S.C. 154(b) by 0 days.

(21) Appl. No.: 17/192,059

(22) Filed: Mar. 4, 2021

(65) Prior Publication Data

US 2021/0192628 A1 Jun. 24, 2021

Related U.S. Application Data

(63) Continuation of application No. 15/480,765, filed on Apr. 6, 2017, now abandoned.

(51) Int. Cl.
*G06Q 40/00* (2012.01)
*G06Q 40/06* (2012.01)
*G06N 5/022* (2023.01)

(52) U.S. Cl.
CPC ............ *G06Q 40/06* (2013.01); *G06N 5/022* (2013.01)

(58) Field of Classification Search
CPC .... G06Q 30/02; G06Q 30/0202; G06Q 40/00; G06Q 40/04; G06Q 40/06
USPC ................................. 705/4, 35–45
See application file for complete search history.

(56) References Cited

U.S. PATENT DOCUMENTS

| 2008/0154792 A1* | 6/2008 | Maggioncalda | ....... G06Q 40/04 705/36 R |
| 2010/0005032 A1* | 1/2010 | Whaley | .................. G06Q 40/04 705/37 |
| 2010/0216545 A1* | 8/2010 | Lange | .................... G06Q 40/04 463/26 |
| 2014/0164290 A1* | 6/2014 | Salter | .................... G06Q 40/06 705/36 R |

(Continued)

*Primary Examiner* — Rajesh Khattar
*Assistant Examiner* — Mohammed H Mustafa
(74) *Attorney, Agent, or Firm* — Rosenberg, Klein & Lee

(57) ABSTRACT

The current invention pertains to the novel, nonobvious, and applicable design and development of an algorithmic system for dynamic conditional asset pricing output and financial intelligence technology platform automation. Core technicality entails the consistent estimation of dynamic conditional alphas after one controls for myriad fundamental characteristics such as market risk, size, value, momentum, asset investment growth, and operating profitability through recursive multivariate filtration. Conditional specification test evidence supports the use of the dynamic conditional multifactor asset pricing model against the static alternatives. The fintech platform allows users to interact with one another by transmitting valuable units of financial intelligence and information in an online social network. The information units include dynamic conditional alpha rank order, key financial ratio summary, quadripartite visualization of financial data, and financial statement analysis. The fintech platform automates social network functions for better interactive engagement through minimum viable cloud computing facilities for web mobile app design.

16 Claims, 20 Drawing Sheets

(56) References Cited

U.S. PATENT DOCUMENTS

2016/0379304 A1* 12/2016 Jha .................. G06Q 40/04
　　　　　　　　　　　　　　　　　　　　705/37

* cited by examiner

| Statistic | SLB1 | FF3 | FFC4 | FF5 | FFC6 | BRIDE6 | Return | Stdev | Sharpe | Specification |
|---|---|---|---|---|---|---|---|---|---|---|
| Average | -17.05% | -17.05% | -16.37% | -15.05% | -14.61% | -15.37% | -3.28% | 16.855 | 0.53% | 458.6 |
| Standard Deviation | 59.97% | 58.06% | 58.11% | 57.12% | 57.16% | 66.01% | 60.01% | 11.713 | 2.67% | 9383.8 |
| Skewness | -434.40% | -450.66% | -458.50% | -446.95% | -450.91% | -461.42% | -448.58% | 7.049 | -61.55% | 44.9 |
| Kurtosis | 6301.74% | 6842.97% | 6844.00% | 7055.24% | 6975.52% | 7253.12% | 6476.57% | 154.658 | 647.96% | 2276.5 |
| Quantile 10% | -71.23% | -67.70% | -66.79% | -61.72% | -60.84% | -73.84% | -55.87% | 6.781 | -2.44% | 0.1 |
| Quantile 20% | -36.41% | -35.95% | -35.16% | -31.56% | -31.09% | -39.00% | -20.16% | 9.061 | -1.01% | 1.5 |
| Quantile 30% | -19.27% | -20.27% | -18.59% | -18.35% | -17.57% | -23.03% | -3.88% | 10.941 | -0.22% | 5.7 |
| Quantile 40% | -9.69% | -11.49% | -9.93% | -10.40% | -9.33% | -12.19% | 4.76% | 12.729 | 0.32% | 14.0 |
| Quantile 50% | -2.88% | -4.73% | -3.72% | -4.21% | -3.43% | -3.64% | 10.29% | 14.541 | 0.80% | 25.8 |
| Quantile 60% | 2.57% | 0.71% | 1.38% | 0.61% | 1.33% | 3.56% | 14.09% | 16.678 | 1.29% | 44.2 |
| Quantile 70% | 7.47% | 5.63% | 6.16% | 5.69% | 6.04% | 10.19% | 18.46% | 19.322 | 1.74% | 75.8 |
| Quantile 80% | 11.64% | 10.33% | 10.38% | 10.50% | 10.56% | 17.97% | 23.55% | 22.875 | 2.29% | 133.2 |
| Quantile 90% | 18.09% | 18.03% | 17.72% | 18.82% | 19.10% | 30.88% | 31.24% | 28.663 | 3.05% | 323.1 |

FIG. 13

| Decile | SLB1 | FF3 | FFC4 | FF5 | FFC6 | BRIDE6 |
|---|---|---|---|---|---|---|
| 1 | -91.9% | -93.8% | -94.7% | -92.5% | -93.2% | -78.5% |
| 2 | -27.1% | -27.2% | -27.5% | -23.1% | -26.2% | 5.4% |
| 3 | -6.3% | -3.9% | -7.0% | -5.7% | -6.1% | 7.6% |
| 4 | 6.2% | 7.9% | 7.1% | 8.1% | 8.1% | 14.2% |
| 5 | 11.7% | 12.6% | 12.0% | 13.4% | 12.4% | 18.3% |
| 6 | 16.0% | 15.9% | 16.0% | 18.7% | 19.0% | 21.9% |
| 7 | 20.0% | 20.2% | 20.6% | 22.0% | 22.3% | 20.5% |
| 8 | 24.7% | 23.5% | 23.8% | 24.1% | 24.3% | 25.6% |
| 9 | 27.2% | 26.2% | 26.4% | 28.5% | 28.5% | 27.7% |
| 10 | 44.2% | 42.4% | 43.4% | 44.1% | 43.7% | 40.3% |
| Average | 2.5% | 2.4% | 2.0% | 3.8% | 3.3% | 10.3% |

FIG. 14

| Percentile | SLB1 | FF3 | FFC4 | FF5 | FFC6 | BRIDE6 |
|---|---|---|---|---|---|---|
| 1 | 0.99 | 0.98 | 0.98 | 0.99 | 1.00 | 1.02 |
| 2 | 1.00 | 0.98 | 0.98 | 0.99 | 0.99 | 1.03 |
| 3 | 1.00 | 0.99 | 0.99 | 1.00 | 1.00 | 1.04 |
| 4 | 1.00 | 0.99 | 0.99 | 1.00 | 1.00 | 1.04 |
| 5 | 0.99 | 0.98 | 0.99 | 0.98 | 0.98 | 1.04 |
| 6 | 1.02 | 1.02 | 1.01 | 1.02 | 1.01 | 1.04 |
| 7 | 1.01 | 1.00 | 1.00 | 1.00 | 1.00 | 1.04 |
| 8 | 1.01 | 1.00 | 1.00 | 1.01 | 1.01 | 1.06 |
| 9 | 1.03 | 1.03 | 1.02 | 1.02 | 1.01 | 1.05 |
| 10 | 1.02 | 1.00 | 1.00 | 1.01 | 1.01 | 1.07 |
| 11 | 1.02 | 1.03 | 1.02 | 1.02 | 1.02 | 1.07 |
| 12 | 1.04 | 1.03 | 1.03 | 1.02 | 1.02 | 1.07 |
| 13 | 1.03 | 1.02 | 1.01 | 1.00 | 1.00 | 1.06 |
| 14 | 1.03 | 1.02 | 1.02 | 1.01 | 1.01 | 1.06 |
| 15 | 1.04 | 1.02 | 1.02 | 1.01 | 1.02 | 1.06 |
| 16 | 1.03 | 1.03 | 1.02 | 1.02 | 1.02 | 1.04 |
| 17 | 1.03 | 1.03 | 1.02 | 1.01 | 1.01 | 1.06 |
| 18 | 1.04 | 1.02 | 1.01 | 1.01 | 1.01 | 1.06 |
| 19 | 1.04 | 1.01 | 1.01 | 1.01 | 1.01 | 1.08 |
| 20 | 1.04 | 1.02 | 1.02 | 1.01 | 1.01 | 1.04 |

FIG. 15

| Portfolio | Mean | Stdev | Sharpe | Skew | Kurt | Qu10% | Qu25% | Qu50% | Qu75% | Qu90% |
|---|---|---|---|---|---|---|---|---|---|---|
| MRP | 0.5% | 4.3% | 0.111 | -67.1% | 161% | -4.8% | -2.0% | 0.8% | 3.1% | 5.4% |
| SMB | 0.1% | 2.0% | 0.072 | -10.7% | 184% | -2.2% | -0.8% | 0.1% | 1.4% | 2.5% |
| HML | 0.3% | 2.3% | 0.140 | 51.2% | 541% | -1.9% | -0.9% | 0.2% | 1.3% | 2.7% |
| RMW | 0.3% | 1.5% | 0.237 | -3.5% | 204% | -1.4% | -0.4% | 0.4% | 1.2% | 1.9% |
| CMA | 0.2% | 1.9% | 0.124 | 60.5% | 389% | -1.6% | -0.6% | 0.1% | 1.0% | 2.2% |
| UMD | 0.6% | 4.0% | 0.155 | -49.7% | 692% | -3.1% | -0.8% | 0.8% | 2.6% | 4.4% |
| VME1 | 0.2% | 1.7% | 0.120 | -69.9% | 1079% | -1.5% | -0.6% | 0.2% | 1.0% | 1.8% |
| VME2 | 0.3% | 2.2% | 0.158 | -38.6% | 260% | -2.2% | -0.7% | 0.5% | 1.5% | 2.6% |
| VME3 | 0.3% | 3.8% | 0.079 | -27.3% | 1527% | -2.3% | -1.1% | 0.2% | 1.6% | 2.9% |
| VME4 | 0.5% | 4.0% | 0.126 | -66.1% | 564% | -3.4% | -1.0% | 0.7% | 2.4% | 4.7% |
| VME5 | 0.2% | 1.3% | 0.126 | 38.3% | 43% | -1.3% | -0.7% | 0.1% | 0.9% | 1.7% |
| VME6 | 0.2% | 1.4% | 0.159 | -49.9% | 85% | -1.5% | -0.5% | 0.3% | 1.1% | 2.0% |
| VME7 | 0.2% | 4.9% | 0.039 | -40.7% | 1313% | -3.2% | -1.6% | -0.1% | 1.9% | 3.8% |
| VME8 | 0.4% | 5.3% | 0.082 | 0.6% | 667% | -4.6% | -1.7% | 0.5% | 2.6% | 5.1% |
| VME9 | 0.1% | 4.4% | 0.027 | -33.7% | 936% | -3.7% | -1.9% | 0.3% | 1.9% | 4.2% |
| VME10 | 0.8% | 5.2% | 0.162 | -48.0% | 330% | -4.3% | -1.2% | 0.7% | 3.5% | 6.0% |
| VME11 | 0.2% | 3.3% | 0.058 | -9.4% | 813% | -3.1% | -1.6% | 0.0% | 1.8% | 3.5% |
| VME12 | 0.6% | 4.2% | 0.138 | -89.7% | 506% | -4.2% | -0.8% | 0.9% | 2.6% | 5.0% |
| VME13 | 0.7% | 4.2% | 0.160 | -14.8% | 688% | -3.4% | -1.3% | 0.6% | 2.6% | 5.2% |
| VME14 | 0.2% | 4.6% | 0.046 | -36.9% | 277% | -4.9% | -1.9% | 0.5% | 2.3% | 5.0% |
| VME15 | 0.1% | 2.4% | 0.046 | 11.4% | 31% | -2.8% | -1.5% | 0.0% | 1.5% | 3.2% |
| VME16 | 0.4% | 2.9% | 0.138 | -18.4% | 160% | -3.2% | -1.2% | 0.4% | 2.3% | 3.7% |
| VME17 | 0.3% | 2.2% | 0.120 | 56.0% | 268% | -2.3% | -1.0% | 0.2% | 1.4% | 2.8% |
| VME18 | 0.1% | 2.4% | 0.062 | -60.0% | 137% | -2.7% | -1.0% | 0.2% | 1.8% | 2.7% |
| VME19 | 0.1% | 1.1% | 0.069 | 82.4% | 350% | -1.1% | -0.8% | 0.0% | 0.6% | 1.2% |
| VME20 | 0.0% | 1.1% | 0.021 | -36.5% | 381% | -1.2% | -0.8% | 0.0% | 0.6% | 1.2% |
| VME21 | 0.2% | 5.6% | 0.039 | -15.8% | 21% | -6.2% | -3.3% | 0.1% | 4.1% | 7.4% |
| VME22 | 0.8% | 5.2% | 0.157 | -35.7% | 234% | -5.2% | -2.2% | 1.1% | 3.8% | 6.9% |

Graphical User Interface (GUI) for Top 100 Alpha Investor Group

| Present Portfolio Value | Present Portfolio Date | Initial Portfolio Date | Current Alpha Rank |
|---|---|---|---|
| Favorite | Archive | Message | Update |
| Virtual Portfolio Current Allocation | Virtual Portfolio Current Date | Virtual Portfolio Prior Allocation | Virtual Portfolio Alpha Rank |
| Stock symbol #1 = 35% | Recent trade date #1 | Trade gain/loss date #1 | High alpha investor #1 |
| Stock symbol #2 = 25% | Recent trade date #2 | Trade gain/loss date #2 | High alpha investor #2 |
| Stock symbol #3 = 20% | Recent trade date #3 | Trade gain/loss date #3 | High alpha investor #3 |
| Stock symbol #4 = 10% | Recent trade date #4 | Trade gain/loss date #4 | High alpha investor #4 |
| Stock symbol #5 = 10% | Recent trade date #5 | Trade gain/loss date #5 | High alpha investor #5 |
| Stock symbol #6 | Recent trade date #6 | Trade gain/loss date #6 | High alpha investor #6 |
| Stock symbol #7 | Recent trade date #7 | Trade gain/loss date #7 | High alpha investor #7 |
| Stock symbol #8 | Recent trade date #8 | Trade gain/loss date #8 | High alpha investor #8 |
| Stock symbol #9 | Recent trade date #9 | Trade gain/loss date #9 | High alpha investor #9 |
| Stock symbol #10 | Recent trade date #10 | Trade gain/loss date #10 | High alpha investor #10 |
| Stock symbol #11 | Recent trade date #11 | Trade gain/loss date #11 | High alpha investor #11 |
| Stock symbol #12 | Recent trade date #12 | Trade gain/loss date #12 | High alpha investor #12 |
| Stock symbol #13 | Recent trade date #13 | Trade gain/loss date #13 | High alpha investor #13 |
| Stock symbol #14 | Recent trade date #14 | Trade gain/loss date #14 | High alpha investor #14 |
| Stock symbol #15 | Recent trade date #15 | Trade gain/loss date #15 | High alpha investor #15 |
| Stock symbol #16 | Recent trade date #16 | Trade gain/loss date #16 | High alpha investor #16 |
| Stock symbol #17 | Recent trade date #17 | Trade gain/loss date #17 | High alpha investor #17 |
| Stock symbol #18 | Recent trade date #18 | Trade gain/loss date #18 | High alpha investor #18 |
| Stock symbol #19 | Recent trade date #19 | Trade gain/loss date #19 | High alpha investor #19 |
| Stock symbol #20 | Recent trade date #20 | Trade gain/loss date #20 | High alpha investor #20 |
| Other stock symbols <click for more> | Other recent trades <click for more> | Other trade updates <click for more> | Other alpha investors <click for more> |

FIG. 21

ALGORITHMIC SYSTEM FOR DYNAMIC CONDITIONAL ASSET PRICING ANALYSIS AND FINANCIAL INTELLIGENCE TECHNOLOGY PLATFORM AUTOMATION

RELATED PATENTS AND APPLICATIONS

This application is a continuation of co-pending U.S. patent application Ser. No. 15/480,765, filed on Apr. 6, 2017 and incorporated herein by reference.

BACKGROUND OF THE INVENTION

Field of the Current Invention

The current invention pertains to the new, non-obvious, and applicable econometric design and implementation of an algorithmic system for better risky asset return prediction and financial intelligence technology (fintech) platform automation. The critical elements of new technicality land in our dynamic conditional alpha and beta estimation for better asset return prediction and algorithmic fintech platform automation.

The current invention entails the use of a recursive multivariate filter for the econometrician to extract dynamic conditional alpha and beta time-series for more accurate asset return prediction. This statistical analysis suggests a robust positive relation between dynamic conditional alphas and Sharpe ratios of average excess returns to return volatility after the econometrician controls for multiple fundamental characteristics, asset investment styles, and portfolio tilts. These main characteristics are market risk, size, value, momentum, asset growth, and operating profitability The current invention involves a new rigorous conditional specification test for hypothesis test design and development in risky asset return prediction. In effect, this test helps distinguish the dynamic and static multifactor asset pricing models. The preponderance of our empirical results for U.S. individual stocks and international stock, bond, currency, and commodity portfolios favors the use of dynamic conditional alpha analysis in contrast to static asset return prediction.

Through fast and stable cloud computing facilities for mobile web app design and encryption, the current invention automates the dynamic conditional alpha estimation and the algorithmic fintech platform. With a reasonably modular and interactive social network, the fintech platform helps optimize active-click mutual engagement (ACME) among active users through both the centrifugal and centripetal user interactions as well as the time-specific rank order of each active end user's asset portfolio value ceteris paribus. ACME increases exponentially when the highly modular algorithmic fintech platform boosts these user interactions, improves individual users' dynamic conditional alpha ranks, and/or causes significant changes in structural characteristics such as demographic attributes, interests, behaviors, other platform usage patterns, and so forth.

Description of the Relevant Prior Art

In recent years, the global financial industry has evolved much to benefit investors with creative analytic tools for stock return prediction. Examples include the linguistic interpretation of social network traffic, investor sentiment, online news, and stock price trend neighborhood. However, the contemporary analytical tools do not offer user interfaces that directly link to the empirical asset pricing literature. Specifically, most of the prior inventions for better risky asset return prediction fail to include a host of relevant explanatory factors such as market risk, size, value, momentum, asset investment growth, and net operating profitability. This critical omission of relevant fundamental characteristics introduces persistent statistical estimation bias, causes this estimation to be inconsistent (as the estimates cannot converge to the true parameters even in sufficiently large samples), and hence renders the resultant hypothesis tests invalid. For this reason, we develop a novel system to meet the unfulfilled demand for robust and accurate stock return prediction at reasonably high frequency. The prior inventions that pertain to the specific field of asset return prediction include the American, Chinese, and Taiwanese patents below:

U.S. Pat. No. 8,380,607B2;
US Patent Pub. No. 2003/0135445A1;
U.S. Pat. No. 8,666,877B2;
US Patent Pub. No. 20090287611A1;
U.S. Pat. No. 8,600,860B2;
US Patent Pub. No. 20140214722A1;
U.S. Pat. No. 8,712,897B2;
U.S. Pat. No. 8,700,516B2;
U.S. Pat. No. 7,752,099B2;
US Patent Pub. No. 2010/0318472A1;
US Patent Pub. No. 2015/0278954A1;
U.S. Pat. No. 8,595,118B2;
Chinese Patent Pub. No. CN104951903A;
Taiwanese Patent Pub. No. TW 200933517; all of which are incorporated herein in their entirety.

SUMMARY OF THE INVENTION

The current invention designs and develops a new algorithmic system for dynamic conditional asset pricing analysis and financial intelligence technology platform automation. The technical innovation relates to the consistent estimation of dynamic conditional factor premiums after the econometrician readily controls for several explanatory factors (such as market risk, size, value, momentum, asset investment growth, and operating profitability) through the use of a recursive multivariate filter. At any reasonable confidence level, the resultant dynamic conditional alphas positively correlate with both Sharpe reward-risk ratios and market-value-weighted portfolio average excess returns.

The current invention also sheds fresh light on key algorithmic financial intelligence technology platform automation. This algorithmic automation allows end users to interact with abundant financial intelligence and information such as dynamic conditional alpha rank order, financial ratio summary, quadripartite visualization of financial price and return data both over time and in the cross-section, and financial statement analysis. The current invention thus automates the algorithmic financial intelligence technology platform via cloud computing facilities for mobile web app design.

With a reasonably modular and interactive social network, the fintech platform helps optimize active-click mutual engagement (ACME) among active users through both the centrifugal and centripetal user interactions and the time-specific rank order of each active user's asset portfolio value ceteris paribus. ACME rises exponentially when the highly modular algorithmic fintech platform boosts these user interactions, raises individual users' dynamic conditional alpha ranks, and/or causes significant changes in user-specific structural characteristics such as demographic attributes, interests, behaviors, other platform usage patterns, and so forth.

The current invention develops a novel, non-obvious, and applicable dynamic conditional asset pricing system for more effective risky asset return prediction. This prediction focuses on the highly volatile excess returns and dynamic conditional alphas on stocks, bonds, currencies, and commodities. This dynamic conditional asset pricing system encompasses a cloud database for financial data retrieval. For each given risky asset, the resultant output comprises the dynamic conditional alpha estimate, key financial ratio summary, quadripartite visualization of financial price and return data over time and in the cross-section, as well as financial statement analysis. The algorithmic platform serves as an interactive social network for all users to exchange highly relevant analytic intelligence and information. As a consequence, this transmission mechanism can help improve the financial literacy and inclusion of the general public.

In the current invention, we design and configure the dynamic conditional asset pricing system with a recursive multivariate filter to extract dynamic conditional factor premiums. These factor premiums turn out to be volatile alphas and betas that move in tandem with cyclical fluctuations. Also, we develop a new and non-obvious conditional specification test to differentiate the static and dynamic conditional multifactor asset pricing models. Both the recursive multivariate filter and the conditional specification test serve as the core statistical contributions to the algorithmic financial intelligence technology platform.

In the current invention, we design and develop an algorithmic financial intelligence technology platform ("fintech platform"). This fintech platform embeds a dynamic conditional asset pricing system for more accurate risky asset return prediction, an internal cloud processor for financial intelligence and information output, as well as another internal cloud module with most social network functions. By using this fintech platform, all the end users can interact with one another by transmitting rich and relevant analytic intelligence and information in order to help inform better and wiser asset investment decisions. This informative transmission encapsulates each user's status updates, posts, likes, unlikes, dislikes, views, comments, favorites, shares, tracks, tags, saves, invites, notes, messages, web traffic statistics, and so forth. Through fast and stable cloud computing facilities for both mobile web app design and encryption, the current invention automates the dynamic conditional alpha estimation and the algorithmic fintech platform. With a highly modular and interactive online social network, the algorithmic fintech platform helps optimize active-click mutual engagement among active users through both the centrifugal and centripetal end-user analytic transmission as well as time-specific rank order of portfolio value.

The subsequent section dovetails the numerous illustrative diagrams with the above executive summary of the current invention plus its core technical features and advantages. Next, another section describes and discusses the mechanical components of the algorithmic fintech platform with particular references to these illustrative diagrams. Primary technicality emerges from the novel and non-obvious use of statistical innovations such as the recursive multivariate filter and the conditional specification test in the dynamic conditional asset pricing system. This system generates dynamic conditional factors premiums for more accurate risky asset return prediction at the heart of the algorithmic fintech platform. This reasonably modular and interactive fintech platform helps transmit key financial intelligence and information among all end users who can then benefit from greater financial literacy, inclusion, and engagement.

BRIEF DESCRIPTION OF THE DRAWINGS

We provide a brief description of each of the illustrative drawings below:

FIG. 13 tabulates the descriptive statistics for SLB1, FF3, FFC4, FF5, FFC6, BRIDE6 alpha estimates, mean excess returns, standard deviations, Sharpe ratios, and conditional specification $\chi^2$ test statistics;

FIG. 14 tabulates the core empirical evidence of the static and dynamic conditional alphas;

FIG. 15 tabulates the evidence of dynamic conditional alpha model improvements from the top percentile to the top quintile;

FIG. 17 tabulates descriptive statistics for the Value-and-Momentum-Everywhere (VME) and Fama-French-Carhart (FFC) monthly portfolio returns;

FIG. 18 juxtaposes the FFC6 static multifactor time-series regression results with the BRIDE6 dynamic conditional recursive multivariate filter results;

FIG. 21 shows an end user interface for the Top 100 dynamic conditional alpha investor group.

DETAILED DESCRIPTION OF THE PREFERRED EMBODIMENTS

We describe an exemplary embodiment of the current invention in detail below. We should note that the current invention should not be limited to the precise form as we readily disclose herein, and the scope of the current invention should not be exhaustively confined to the embodiments set forth hereinafter.

Figure 1:
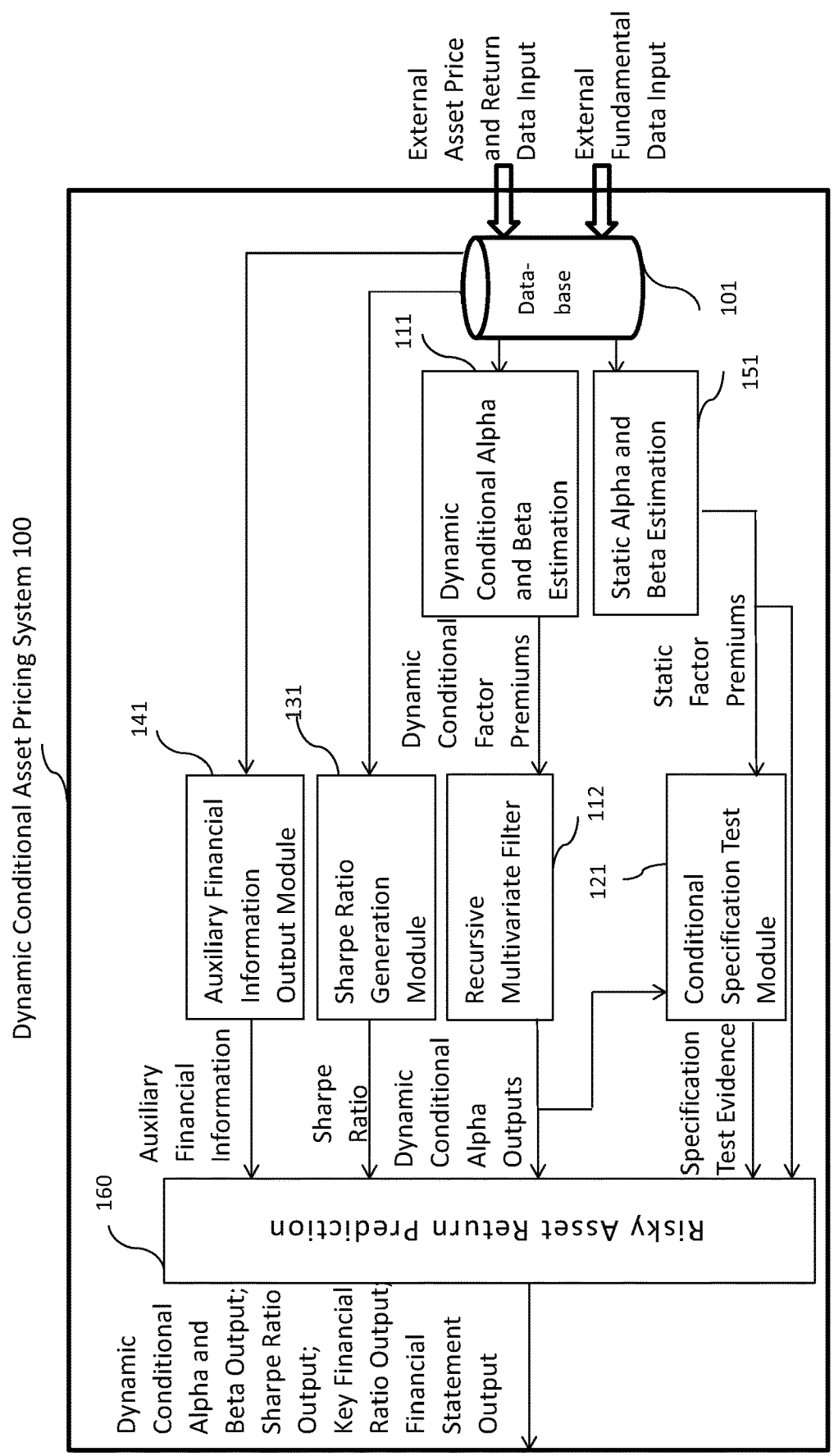
FIG. 1 serves as a rich system block diagram and illustrates the algorithmic dynamic conditional asset pricing system in accordance with an exemplary embodiment of the current invention.
Figure 2:
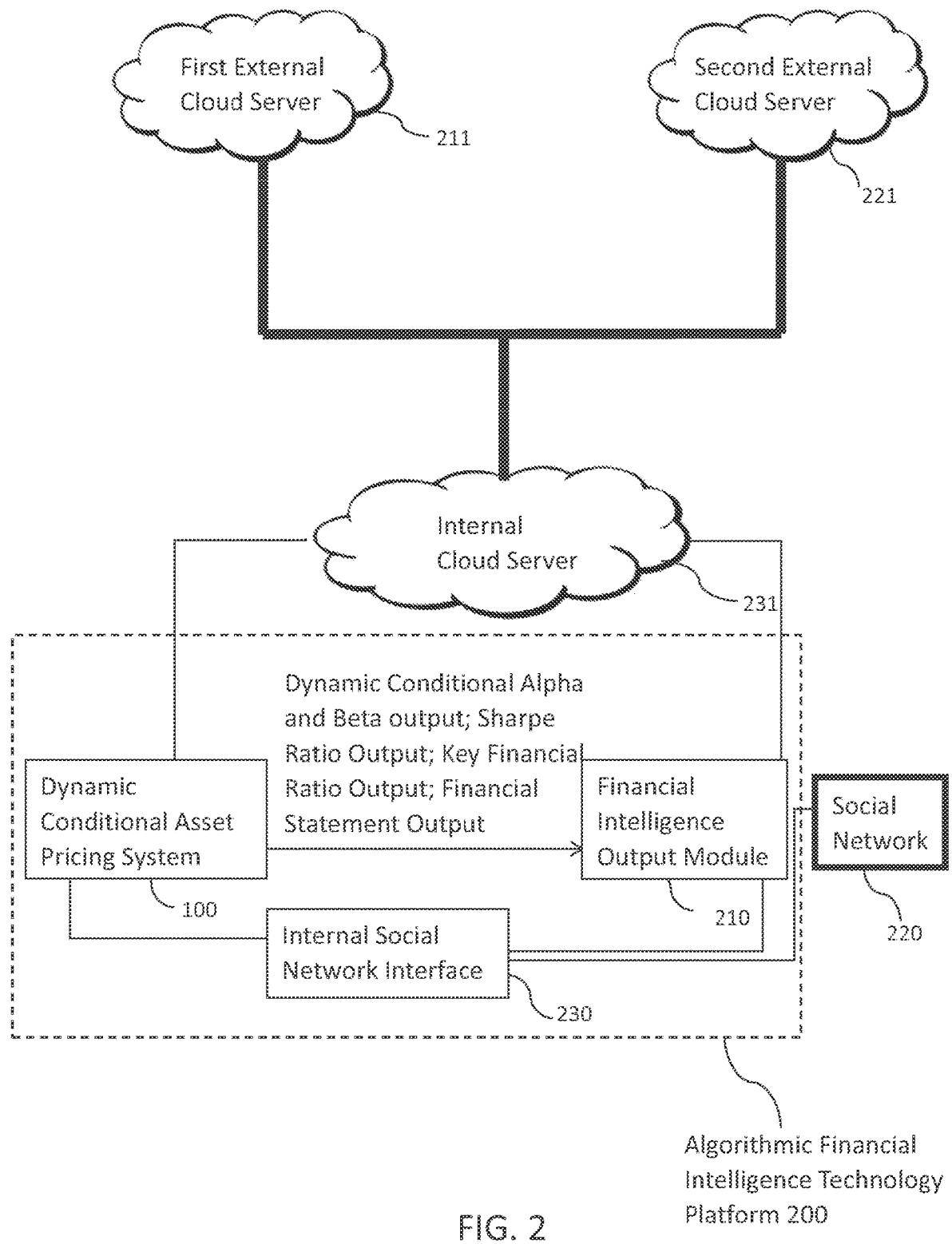
FIG. 2 illustrates the topological architecture of an algorithmic financial intelligence technology platform in accordance with an exemplary embodiment of the current invention.

We start with FIG. 1 and FIG. 2. FIG. 1 shows a system block diagram of an algorithmic system for dynamic conditional asset pricing analysis, and FIG. 2 shows the topological architecture of a financial intelligence technology (fintech) platform that embeds the prior algorithmic system of FIG. 1 in accordance with an exemplary embodiment of the current invention. FIG. 1 depicts our core implementation of the algorithmic dynamic conditional asset pricing system 100.

The dynamic conditional asset pricing system 100 includes an internal database 101, a dynamic conditional model for both alpha and beta estimation 111, a recursive multivariate filter 112, a conditional specification test module 121, a Sharpe ratio generation module 131, an auxiliary financial information output module 141, a static model for both alpha and beta estimation 151, and a combinatorial system for risky asset return prediction 160. Algorithmic fintech platform automation configures the internal database 101 to retrieve financial data from myriad external cloud servers 211 and 221 set forth in FIG. 2, such as Yahoo Finance, Google Finance, Reuters, FINVIZ, and so on. This internal database 101 connects and sets up a dynamic conditional asset pricing model 111 and a static asset pricing model 151 for both alpha and beta estimation where each alpha denotes the excess asset return after one accounts for beta risk exposure to common characteristics such as market risk, size, value, momentum, net operating profitability, and asset investment growth. In this core embodiment, the dynamic conditional asset pricing model 111 is a dynamic conditional multi-factor model for both alpha and beta estimation. This model is preferably a six-factor dynamic conditional alpha model in which the six factors include market risk, size, value, momentum, net operating profitability, and asset investment growth. It is important to note that the generic term "risky asset" here includes at least one kind of stock, bond, currency, commodity, mutual fund, exchange fund, warrant, and so forth.

In addition to the above, the econometrician makes use of the recursive multivariate filter 112 to extract dynamic conditional factor premiums from the dynamic conditional multi-factor asset pricing model 111. This consistent estimation yields dynamic conditional alphas and betas for each individual risky asset. These dynamic conditional factor premiums vary over time. Hence, the recursive multivariate filter 112 helps extract the full time-series of the dynamic conditional alphas and betas for more accurate risky asset return prediction. The static estimation of multi-factor premiums 151 entails the ordinary least-squares (OLS) regression analysis and generates the static point estimates of both alphas and betas from the static asset pricing model 151.

The conditional specification test module 121 helps the statistician differentiate both the static and dynamic conditional asset pricing models. Then the resultant conditional specification test evidence outputs the $\chi^2$ test statistic and p-value for each risky asset or each risky asset portfolio. A high $\chi^2$ test statistic in double digits, or alternatively a low p-value less than 5%, indicates the consistent estimation of dynamic conditional factor premiums, whereas, the static estimation of multifactor premiums would be statistically inconsistent in this case. Otherwise, the conditional test evidence favors none of the static and dynamic conditional multifactor asset pricing models.

The Sharpe ratio generation module 131 helps generate the Sharpe ratio for each risky asset or each risky asset portfolio (a.k.a. the reward-to-variability or reward-risk ratio). This output arises from raw data from the internal database 101. Further, the auxiliary financial information output module 141 helps process auxiliary financial information in the form of both key financial ratios and financial statements (i.e. balance sheet, income statement, and cash flow statement) as well as mean excess returns and standard deviations directly from the internal database 101. In sum, the risky asset return prediction 160 helps evaluate the myriad sources of financial intelligence and information for the end user to make wise asset investment decisions. This risky asset return prediction 160 thus takes into account a broad variety of financial data and statistics such as dynamic conditional alphas, Sharpe ratios, conditional $\chi^2$ test statistics and p-values, as well as auxiliary mean excess returns, standard deviations, financial ratios such as P/E and PB ratios, and financial statements (i.e. balance sheet, income statement, and cash flow statement).

We now refer to FIG. 2. An internal cloud server 231 hosts an algorithmic financial intelligence technology platform 200. In effect, this algorithmic fintech platform 200 embeds the dynamic conditional asset pricing system 100 of FIG. 1, a financial intelligence output module 210, and an internal social network interface 230 (cf. FIG. 20 and FIG. 201). The financial intelligence output module 210 produces an executive summary of critical financial intelligence and information for each risky asset or each risky asset portfolio on the primary basis of the risky asset return prediction from the dynamic conditional asset pricing system 100. This financial intelligence includes dynamic conditional alpha rank order for the Top 500 individual risky assets for each major asset family, conditional specification test evidence, Sharpe ratio summary, and other financial information, such as average excess return, excess return volatility, and quadripartite visualization of risky asset return frequencies and distributions. The algorithmic fintech platform 200 connects to at least one external social network platform 220 (cf. Facebook, Twitter, LinkedIn, YouTube, Google+, Pinterest, Reddit, Instagram, Flipboard, Tumblr, email, and so on). Hence, each user can interact with other users by transmitting valuable asset return prediction, key financial intelligence, and other information through a graphical user interface (cf. FIG. 20 and FIG. 21).

The internal social network interface 230 integrates all valuable units of platform information (in the form of risky asset return prediction from the dynamic conditional asset pricing system 100 as well as auxiliary financial intelligence from the financial intelligence output module 210) and also connects to at least one external social network platform 220. In effect, the algorithmic fintech platform 200 serves as a new, non-obvious, and applicable proprietary medium between both the respective internal and external social network platforms (230 and 220) to help enhance the overall financial literacy and inclusion of the global general public through active-click mutual engagement (ACME). ACME rises exponentially when the highly modular algorithmic fintech platform boosts both centripetal and centrifugal user interactions, improves individual end users' dynamic conditional alpha ranks, and then causes significant changes in structural characteristics such as demographic attributes, interests, behaviors, other platform usage patterns, and so forth. The internal cloud server 231 connects to multiple external cloud servers such as at least a first external cloud server 211 and a second external cloud server 221. Examples are Yahoo Finance, Google Finance, Reuters, FINVIZ, and so forth. The internal cloud server 231 uses a web scraper to fetch raw data on asset-specific prices, core financial ratios, and financial statements. This web scraper helps parse ticker symbols such that the econometrician can build the internal database 101 in FIG. 1.

We now turn to the technical details of the algorithmic dynamic conditional asset pricing system 100 and the topological architecture of the financial intelligence technology platform 200. In accordance with a subsequent exemplary embodiment of the current invention, the extant asset pricing literature suggests a rather broad taxonomy of "anomalies" that manifest in the form of statistically significant alphas with t-ratios well above 2.0. These alphas are the intercept point estimates from a typical ordinary least-squares (OLS) regression of excess returns on several explanatory variables in a time-series fashion. This static estimation cannot ameliorate potential attenuation bias that arises from measurement noise in the OLS regression estimator. As a result, the OLS regression estimator is not consistent in the econometric sense that the alpha estimates dissipate toward zero in sufficiently large datasets. For this reason, the prudent statistician can alternatively opt for a recursive multivariate filter 112 to extract the entire time-series of alphas from the dynamic conditional alpha model 111. In fact, the conditional dynamism captures the time variation in alpha estimates so that the long-run average alpha converges toward zero since the risk premium for each individual asset varies much over time.

The core technical innovation entails the consistent estimation of dynamic conditional alphas after the econometrician readily controls for several explanatory factors such as market risk, size, value, momentum, asset investment growth, and operating profitability through a recursive multivariate filter 112. The dynamic conditional alphas significantly correlate with both long-term average excess returns and Sharpe ratios (or reward-to-risk ratios in the form of long-term average excess returns per standard deviation) in comparison to the static alphas that one readily estimates from most conventional static models.

The current invention rests on a novel conditional specification test to distinguish the static and dynamic estimators. This test demonstrates sufficient evidence for the econometrician to reject the null hypothesis of a correct static model specification with at least 90% confidence for 62% of 5,600+ U.S. stocks on AMEX, NASDAQ, and NYSE. Thus, the dynamic conditional alpha estimation nests and outperforms the static counterparts in support of the alternative hypothesis that the recursive multivariate filter yields a consistent estimator for U.S. stock return prediction at daily frequency. In fact, the econometrician can extend this new technique to cover a broader array of international risky assets in the subsequent design of a monthly training dataset.

The dynamic conditional alpha model outperforms the static counterparts in several ways. First, the conditional specification test rejects the null hypothesis of correct static asset pricing models for more than 60% of the 5,625 U.S. individual stocks. In this regard, these static models arise as special cases of the dynamic conditional multifactor model. Second, the dynamic conditional alpha model better predicts the superior excess returns than the static asset pricing models. The Top 500 dynamic conditional alphas predict the 41% portfolio average excess return, and the Top 100 dynamic conditional alphas predict the hefty 84% portfolio average excess return. Also, the dynamic conditional alpha rank order produces positive long-term average excess returns with at least 90% confidence, whereas, the static alpha rank order yields positive long-run mean excess returns only 70% of the time. Third, the dynamic conditional multifactor alpha model better improves model accuracy in comparison to baseline concordance in binary top-quantile return prediction. Finally, the novel and non-obvious dynamic conditional alpha model explains 70%+ of the cross-sectional variation in the long-term average excess returns and Sharpe ratios for U.S. individual stocks. Not only does the current invention propose the dynamic conditional alpha model as a superior instrument for stock selection in contrast to the static alternatives, but the current invention also recommends the dynamic conditional alpha model as a better tool for long-term risky asset return prediction.

In addition, the invention contributes to the useful design of algorithmic financial intelligence technology platform automation. This automation allows end users to interact with one another via a rich and relevant set of financial intelligence such as dynamic conditional alpha rank order, key financial ratio summary, quadripartite visualization of financial information both over time and in the cross-section, and financial statement analysis (balance sheet, income statement, and cash flow statement). This fintech platform 200 further encourages valuable user interactions and information exchanges as end users engage in a social network. Each investor indicates his or her personal interests, preferences, and investment styles through the end user interface with the most popular views, stock portfolios, and stock-specific dynamic conditional alphas. Then this online social network embeds individual status updates, posts, likes, unlikes, dislikes, views, comments, favorites, shares, tags, tracks, saves, invites, notes, messages, web traffic statistics, and so forth. The current invention automates the financial intelligence technology platform via cloud computing facilities for mobile web app design.

Next, we discuss the dynamic conditional alpha estimation for profitable stock return prediction. We describe and discuss the novel technique by explaining the recursive multivariate filter 112 as an econometric innovation. We use this filter to extract dynamic conditional factor premiums from the multi-factor asset pricing model 111. For most practical purposes, we offer an intuitive explanation for connecting this recursive multivariate econometric method to the central notion of dynamic multi-factor mean-variance efficiency. A risky asset is multi-factor mean-variance efficient if this asset produces the highest long-run average excess return per standard deviation of this excess return (Merton, 1973; Fama, 1996). This intertemporal explanation adds a crucial twist to the empirical asset pricing literature for better asset return prediction by reconciling the key pervasive and ubiquitous anomalies with the dynamic conditional multi-factor asset pricing model (Sharpe, 1964; Lintner, 1965; Fama and French, 1993, 1995, 1996, 1998, 2004, 2006b, 2008, 2015; Titman, Wei, and Xie, 2004; Cooper, Gulen, and Schill, 2008; Li, Livdan, and Zhang, 2009; Chen, Novy-Marx, and Zhang, 2011; Asness, Moskowitz, and Pedersen, 2013; Hou, Xue, and Zhang, 2014). In the current invention, we consider a reasonably wide array of typical asset pricing anomalies such as size (Banz, 1981), value (Basu, 1977; Rosenberg, Reid, and Lanstein, 1985; Lakonishok, Shleifer, and Vishny, 1994; Fama and French, 1998, 2008), momentum (Jegadeesh and Titman, 1993, 2001; Chan, Jegadeesh, Lakonishok, 1996), asset growth (Titman, Wei, and Xie, 2004; Cooper, Gulen, and Schill, 2008; Fama and French, 2015, 2016), operating profitability (Haugen and Baker, 1996; Collins and Hribar, 2000; Dechow, Hutton, and Sloan, 2000; Richardson, Sloan, Soliman, and Tuna, 2005; Fama and French, 2006b, 2008, 2015, 2016; Novy-Marx, 2013), and long-run contrarian return reversal (DeBondt and Thaler, 1985; Lakonishok, Shleifer, and Vishny, 1994; Fama and French, 1996, 1998, 2008). Fama and French (2004) offer a comprehensive survey of the asset pricing anomalies that point to the empirical failure of the capital asset pricing model (CAPM). Moreover, Fama and French (2008) revisit the empirical assessment of asset pricing anomalies and in turn suggest that these anomalies tend to concentrate in the extreme deciles or in the microcap portfolio.

We start with the canonical multifactor representation of the key static and dynamic conditional asset pricing equations below:

$$R_{kt} - R_{ft} = \alpha + \sum_{m=1}^{M} \beta_m x_{mt} + \varepsilon_t \qquad \text{Eq.1}$$

$$R_{kt} - R_{ft} = \alpha_t + \sum_{m=1}^{M} \beta_{mt} x_{mt} + \varepsilon_t \qquad \text{Eq.2}$$

where $x_{mt} = \{R_{mt} - R_{ft}, SMB_t, HML_t, RMW_t, CMA_t, UMD_t\}$ denotes the set of Fama-French-Carhart factors such as the market risk premium, the spread between the average returns on the top 30% and bottom 30% deciles that the econometrician sorts on size, book-to-market, asset investment growth, operating profitability, and more recent one-year return momentum; $\alpha$ and $\alpha_t$ represent the respective static and dynamic conditional long-run average excess returns after one controls for the above explanatory variables; $\beta_m$ and $\beta_{mt}$ are the respective static and dynamic conditional factor premiums that correspond to the Fama-French-Carhart factors. Specifically, $(R_{kt} - R_{ft})$ and $(R_{mt} - R_{ft})$ denote the excess returns on the respective individual and market stock portfolios. The latter is the market-value-weighted average return on all of the AMEX, NASDAQ, and NYSE individual stocks from CRSP minus the one-month Treasury bill rate from Ibbotson Associates. $SMB_t$ or Small-Minus-Big is the average return spread between the top 30% and bottom 30% size deciles in terms of market capitalization. $HML_t$ or High-Minus-Low is the average return spread between the top 30% and bottom 30% value portfolio tilts in terms of the book-to-market equity ratio. $CMA_t$ or Conservative-Minus-Aggressive is the average return spread between the top 30% and bottom 30% total asset investment growth deciles. $RMW_t$ or Robust-Minus-Weak is the average return spread between the top 30% and bottom 30% operating profitability deciles. $UMD_t$ or Up-Minus-Down is the average return spread between the top 30% and bottom 30% momentum deciles in terms of most recent past annual stock return performance. The empirical asset pricing literature is replete with substantive evidence in support of this multifactor model representation (Sharpe, 1964; Lintner, 1965; Fama and French, 1993, 1995, 1996, 1998, 2004, 2006b, 2008, 2015, 2016; Titman et al, 2004; Cooper, Gulen, and Schill, 2008; Li, Livdan, and Zhang, 2009; Chen, Novy-Marx, and Zhang, 2011; Asness et al, 2013; Hou et al, 2014).

Eq. 1 focuses on the conventional static point estimates of factor premiums on the respective Fama-French-Carhart explanatory variables. In contrast, we use a recursive multivariate filter to gauge the dynamic estimates of conditional factor premiums as individual time-series in the alternative representation Eq.2. A delicate comparison between Eq.1 and Eq.2 suggests that the former involves the static estimation of factor premiums on the Fama-French-Carhart factors, whereas, the latter entails the dynamic estimation of the entire time-series of conditional factor premiums. The unique technicality of the current invention pertains to the dynamic conditional specification test that helps distinguish the static and dynamic multifactor models. This rigorous analysis suggests statistically significant differences between the static and dynamic conditional alphas for most of the U.S. individual stocks on AMEX, NASDAQ, and NYSE. Another major new and nonobvious innovation shows that the dynamic conditional asset pricing model of the current invention significantly outperforms the static alternatives at high frequency in terms of market-value-weighted average decile returns. The subsequent examples apply this statistical analysis with substantive test evidence to 5,600+ U.S. daily stock returns and monthly returns on international stocks, bonds, currencies, and commodities.

The current invention extends and so generalizes the prior art to a broader dynamic conditional multi-factor representation of risky-asset excess returns for both U.S. individual stocks as well as international stock, bond, currency, and commodity portfolios. The conditional asset pricing literature can be traced back to the econometric contributions of Harvey (1989), Shanken (1990), Jagannathan and Wang (1996), Lettau and Ludvigson (2001). Also, Ferson and Harvey (1991, 1993, 1999) empirically connect multi-factor betas to economic fluctuations. Several empirical studies point out the importance of identifying the correct and relevant set of intertemporal state variables (Harvey, 1989; Shanken, 1990; Jagannathan and Wang, 1996; Cochrane, 2001: 145). Lewellen and Nagel (2006) avoid this problem by using short-window regressions. Furthermore, Ang and Chen (2007) and Fama and French (2006) both assume some particular structure of auto-regressive mean reversion or structural breaks in the time-series behavior of market beta. Adrian and Franzoni (2009) permit market beta to vary over time with a univariate version of the recursive filter that the current invention proposes in the broader multivariate context. Ang and Kristensen (2012) test the conditional CAPM and the conditional Fama-French three-factor model and report evidence in favor of the alternative hypothesis that the asset pricing errors are too large for the conditional model to be correctly specified.

The recursive multivariate filter 112 follows the generic matrix representation of the subsequent equations (Kalman, 1960; Harvey and Shephard, 1993: 267-270; Lai and Xing, 2008: 130-133; Tsay, 2010: 591):

$$\beta_{t+1} = A_t \beta_t + \mu_{t+1} \qquad \text{Eq.3}$$

$$r_t + F_t \beta_t \qquad \text{Eq.4}$$

where $\beta_t$ is a $(k+1) \times 1$ vector of conditional factor premiums at each time increment; $A_t$ is a $(k+1) \times (k+1)$ matrix of linear dynamic variation in the state equation of Eq. 3; $r_t$ is a vector of excess returns on a given asset portfolio; $F_t$ is a $T \times (k+1)$ matrix of explanatory factors plus an intercept in the measurement equation of Eq. 4; $u_t$ and $v_t$ are independent random vectors with $E(u_t) = 0$, $cov(u_t) = \Sigma_u$, $E(v_t) = 0$, and cov $(v_t) = \Sigma_v$. The dynamic states $\beta_t$ are unobservable. The observations are the excess returns $r_t$ that are linear transformations of time-varying factor premiums $\beta_t$ via the matrix $F_t$ plus the unobservable random disturbances $u_t$. The recursive multivariate filter 112 is a recursive minimum-variance linear estimator of $\beta_t$ based on the observations up to each time increment. One can define $P_{t|t-1}$ as the covariance estimator of the unobservable state $\beta_t$ and the recursive multivariate filter for the earlier state $\beta_{t|t-1}$. The gain matrix follows the general form below:

$$\eta_t = A_t P_{t|t-1} F_t^T (F_t P_{t|t-1} F_t^T + \Sigma_v)^{-1} \quad \text{Eq.5}$$

For better exposition, we summarize the major formulae for the recursive multivariate filter in Eq. 6 to Eq. 9:

$$\hat{\beta}_{t+1|t} = A_t \hat{\beta}_{t|t-1} + \kappa_t (r_t - F_t \hat{\beta}_{t|t-1}) \quad \text{Eq.6}$$

$$P_{t+1|t} = (A_t - \kappa_t F_t) P_{t|t-1} (A_t - \kappa_t F_t)^T + \Sigma_u + \kappa_t \Sigma_v \kappa_t^T \quad \text{Eq.7}$$

$$\hat{\beta}_{t|t} = \hat{\beta}_{t|t-1} + P_{t|t-1} F_t^T (F_t P_{t|t-1} F_t^T + \Sigma_v)^{-1} (r_t - F_t \hat{\beta}_{t|t-1}) \quad \text{Eq.8}$$

$$P_{t|t} = P_{t|t-1} - P_{t|t-1} F_t^T (F_t P_{t|t-1} F_t^T + \Sigma_v)^{-1} F_t P_{t|t-1} \quad \text{Eq.9}$$

where the recursions are initialized at $\beta_{1|0} = E(\beta_1)$ and $P_{1|0} = \text{cov}(\beta_1)$. Due to its recursive nature, this multivariate filter ensures that any residual measurement noise between the real-time state and its most up-to-date estimator is zero on average. Therefore, the conditional expectation of the last term in Eq.8 equates zero.

It is well-known that the static ordinary least-squares (OLS) regression often causes attenuation bias in the resultant inconsistent estimator in the presence of measurement noise. This persistent attenuation bias introduces a non-trivial covariance between the explanatory regressors and the residual disturbance term. As a consequence, the static estimator becomes inconsistent and does not converge toward the true parameter vector even in a sufficiently large dataset. The recursive multivariate filter directly addresses this issue by recursively adjusting the dynamic estimates of key parameters to ameliorate any measurement noise. As the data span grows larger, these dynamic estimates can become more accurate in converging toward the moving targets of true parameters such that any residual measurement noise dissipates to zero. These analytical results manifest in the conditional expectation of each side of Eq. 8.

We turn to the dynamic conditional specification test and its mathematical derivation. This test helps us draw a statistical distinction between the static and dynamic conditional alpha models. Under the null hypothesis, the static and dynamic conditional estimators are both consistent and asymptotically normal while the static estimator attains the Cramer-Rao lower bound and thus is efficient in the conventional econometric nomenclature with the parameter vector $\theta = \{\alpha, \beta_{MRP}, \beta_{SMB}, \beta_{HML}, \beta_{RMW}, \beta_{CMA}, \beta_{UMD}\}$. We can then define the distance between the dynamic and static conditional estimators as $\xi = \theta_d - \theta_s$. The null hypothesis suggests zero distance between the static and dynamic conditional estimators:

$$\hat{\xi} = \hat{\theta}_d - \hat{\theta}_s \Rightarrow H_0: \theta_d = \theta_s \Rightarrow H_0: \xi = 0 \quad \text{Eq.10}$$

We also define the variance-covariance matrix for the distance between each estimator and its respective true parameter vector ($V_s$ and $V_d$) by the following equations:

$$N^{1/2} \cdot (\hat{\theta}_s - \theta_s) \sim N(0, V_s) \quad \text{Eq.11}$$

$$N^{1/2} \cdot (\hat{\theta}_d - \theta_d) \sim N(0, V_d) \quad \text{Eq.12}$$

The proof begins with the naïve assumption that the static estimator is not orthogonal to the gap between the static and dynamic conditional estimators. Then, the mathematical derivation leads to a contradiction to affirm the alternative case that the static estimator is indeed orthogonal to the vector wedge between the static and dynamic conditional estimators. The crux of this proof relies on the Cramer-Rao efficiency condition that the distance between the static and dynamic conditional variance-covariance matrices must be positive-semidefinite. Later we use a unique algorithm to deal with the rare instances where this vector wedge is negative-semidefinite.

We define the dynamic conditional estimator as the static estimator plus some multiple of the above vector wedge while the latter term equates nil under the null hypothesis ($H_0: \xi = \theta_d - \theta_s = 0$):

$$\theta_d = \hat{\theta}_s + kM\hat{\xi} \Rightarrow p \lim \hat{\xi} = 0 \quad \text{Eq.13}$$

where k is a scalar and M is a chosen matrix. We next expand the variance-covariance matrix for the dynamic conditional estimator below:

$$V(\hat{\theta}_d) = V(\hat{\theta}_s) + kMQ + kM^T Q^T + k^2 MV(\hat{\xi})M^T \Rightarrow$$
$$Q = \text{cov}(\hat{\theta}_s, \hat{\xi}) \quad \text{Eq.14}$$

We expand the vector wedge between the respective variance-covariance matrices for the static and dynamic conditional estimators below:

$$W(k) = V(\hat{\theta}_d) - V(\hat{\theta}_s) = kMQ + kQ^T M^T + k^2 MV(\hat{\xi})M^T \quad \text{Eq.15}$$

We derive the first-order and second-order derivatives of this vector wedge with respect to k:

$$\nabla_k W(k) = MQ + Q^T M^T + 2kMV(\hat{\xi})M^T \quad \text{Eq.16}$$

$$\nabla_k^2 W(k) = 2MV(\hat{\xi})M^T \quad \text{Eq.17}$$

Eq. 17 suggests that the second-order derivative is positive definite. As a consequence, we can find the minimum vector wedge when we set the first-order condition Eq. 16 to zero:

$$\nabla_k W(k) = MQ + Q^T M^T = 2kMV(\hat{\xi})M^T = 0 \Rightarrow$$
$$M = -(2kV(\hat{\xi}))^{-1} Q^T \quad \text{Eq.18}$$

By definition, we know the equality $W(k=0)=0$. When we evaluate the first-order derivative at $k=0$, this resultant matrix cannot be positive-semidefinite:

$$\nabla_k W(k=0) = MQ + Q^T M^T = -(2kV(\hat{\xi}))^{-1} 2 Q^T Q =$$
$$-(kV(\hat{\xi}))^{-1} Q^T Q \quad \text{Eq.19}$$

Eq. 19 suggests that the resultant matrix must not be positive-semidefinite. This solution poses a contradiction to the assumption that W(k) must be positive-semidefinite. For arbitrarily small values of k, Eq. 19 suggests that W(k) can be negative-semidefinite. In turn, this contradiction suggests that Q equates a null matrix. In other words, we observe zero covariance between the static estimator and its distance from the dynamic conditional estimator. This analytical result leads us to derive the dynamic conditional specification test below (Durbin, 1954; Wu, 1973; Hausman, 1978; Nakamura and Nakamura, 1981; White, 1982; Newey, 1985; Tauchen, 1985):

$$\hat{\xi} = \hat{\theta}_d - \hat{\theta}_s \Rightarrow \hat{\xi} + \hat{\theta}_s = \hat{\theta}_d \Rightarrow V(\hat{\xi}) + V(\hat{\theta}_s) = V(\hat{\theta}_d) \Rightarrow$$
$$V(\hat{\xi}) = V(\hat{\theta}_d) - V(\hat{\theta}_s) \quad \text{Eq 20}$$

$$\hat{\xi}^T (T^{-1} \hat{V}(\hat{\xi}))^{-1} \hat{\xi} = T \cdot \hat{\xi}^T (V(\hat{\theta}_d) - V(\hat{\theta}_s))^{-1} \hat{\xi} \sim \chi^2(q) \quad \text{Eq.21}$$

where q denotes the number of parameters as the degrees of freedom for the $\chi^2$ test statistic and T denotes the number of time periods over the entire data span.

While the above dynamic conditional specification test statistic shares the same sandwich form of most econometric tests, the middle matrix may or may not always be positive-semidefinite. This occurrence can arise from the plausible scenario where the static OLS estimator contains so much measurement noise that the dynamic conditional estimator is comparatively similar in terms of econometric efficiency. In this rare case, we need to adjust this unconventional middle matrix to the nearest positive definite matrix (Higham, 2002). This algorithmic approach entails setting any negative eigenvalues to zero to re-approximate the resultant positive definite matrix. While we sometimes run this algorithm to conduct the above dynamic conditional specification test, this extreme but plausible scenario is rather rare. When this scenario occurs in practice, the resultant dynamic conditional specification test statistics do not exceed the critical value and so there is no sufficient evidence to differentiate the static and dynamic conditional estimators. In practice, the dynamic conditional specification test rejects the null hypothesis of a correct static asset pricing model specification, whereas, this rejection suggests that the alternative dynamic conditional alpha model yields consistent estimates. The subsequent empirical examples bolster this inference. The first empirical example demonstrates that the conditional specification test rejects the static asset pricing models in favor of the dynamic conditional alpha model for about 62% of 5,600+ U.S. individual stocks on AMEX, NASDAQ, and NYSE as of June 2016. Also, the second empirical example shows that the conditional specification test rejects the static asset pricing models in support of the new, nonobvious, and useful dynamic conditional alpha model for most equity, fixed-income debt, currency, and commodity value-and-momentum portfolios. Thus the econometric technique of the invention points to the primary advantage of the dynamic conditional factor model over the static multifactor models. The subsequent empirical analysis shows that the dynamic conditional alpha rank order yields positive long-term average excess returns with 90% statistical confidence in comparison to only 70% statistical confidence for the static counterparts.

In the subsequent sections, we analyze a pair of practical examples. The first empirical example concerns the econometric analysis of both static and dynamic conditional alphas for daily U.S. stock returns. The second empirical example concerns the econometric analysis of both static and dynamic conditional alphas for monthly returns on international stocks, bonds, currencies, and commodities. These practical examples complement each other to help us better appreciate the econometric power of a new and non-obvious dynamic conditional asset pricing system that we propose in the current invention.

Example #1: An Empirical Analysis of Dynamic Alphas for Daily U.S. Stock Returns We apply the recursive multivariate filter to empirically analyze dynamic conditional alphas for 5,625 individual U.S. stocks on AMEX, NASDAQ, and NYSE. We first sort and collect all of the daily stock returns for 5,625 U.S. individual stocks on Yahoo Finance as of June 2016 (total market capitalization about US$30+ trillion). Then we estimate both alpha and beta parameters from the static and dynamic conditional models of Eq. 1 and Eq. 2. For better exposition, we suppress the beta output and focus on the static and dynamic conditional alpha output. We run a horse race among the static and dynamic multifactor asset pricing models below:

1. SLB1: We name the single-factor static market risk model as SLB1 (Sharpe, 1964; Lintner, 1965; Black, 1972);
2. FF3: We name the Fama-French three-factor static model with market risk, size, and value as FF3 (Fama and French, 1993);
3. FFC4: We name the Fama-French-Carhart four-factor static model with market risk, size, value, and momentum as FFC4 (Carhart, 1997);
4. FF5: We name the Fama-French five-factor static model with market risk, size, value, asset investment growth, and operating profitability as FF5 (Fama and French, 2015, 2016);
5. FFC6: We name an alternative six-factor static model with market risk, size, value, asset investment growth, operating profitability, and momentum as FFC6 (Carhart, 1997; Cooper, Gulen, and Schill, 2008; Asness, Moskowitz, and Pedersen, 2013; Fama and French, 2015);
6. BRIDE6: We name an alternative six-factor dynamic conditional model with market risk, size, value, momentum, asset growth, and operating profitability as BRIDE6 (Carhart, 1997; Cooper et al, 2008; Asness et al, 2013; Fama and French, 2015, 2016).

Figure 3:
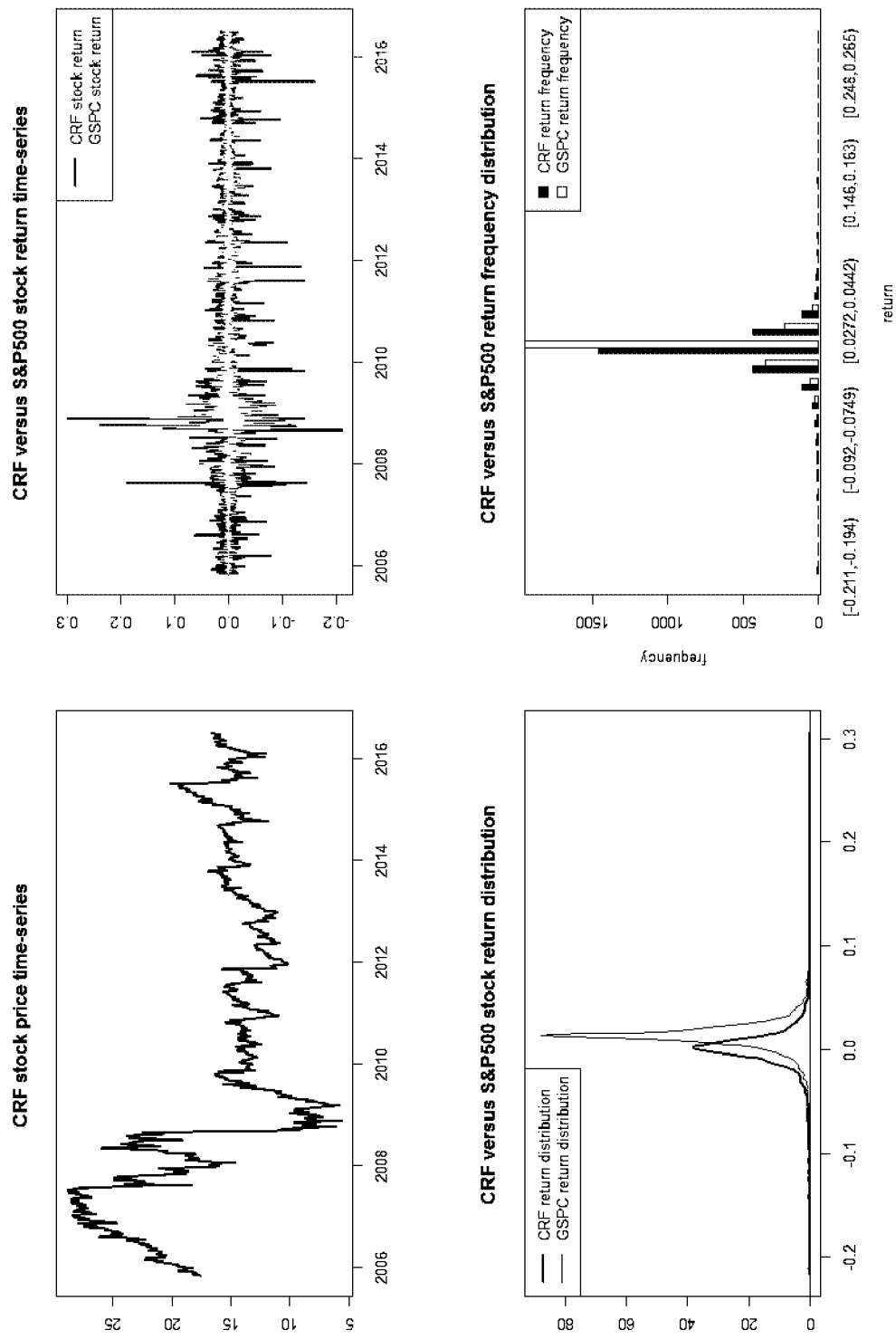
FIG. 3 illustrates the quadripartite visualization of exploratory analysis of the common stock of Cornerstone Total Return Fund, Inc. (CRF)
Figure 4:
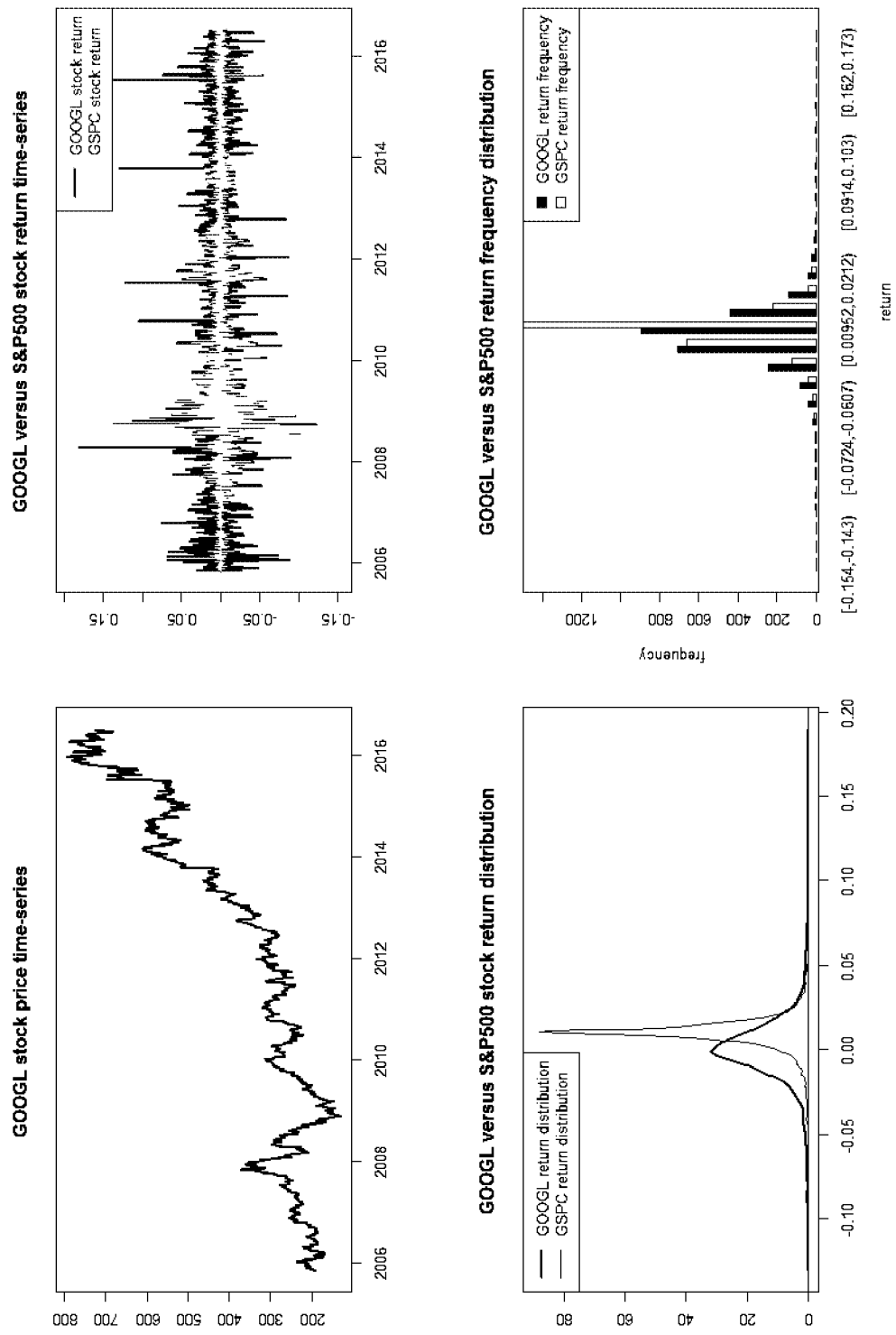
FIG. 4 illustrates the quadripartite visualization of exploratory analysis of the common stock of Alphabet Inc. (GOOGL)
Figure 5:
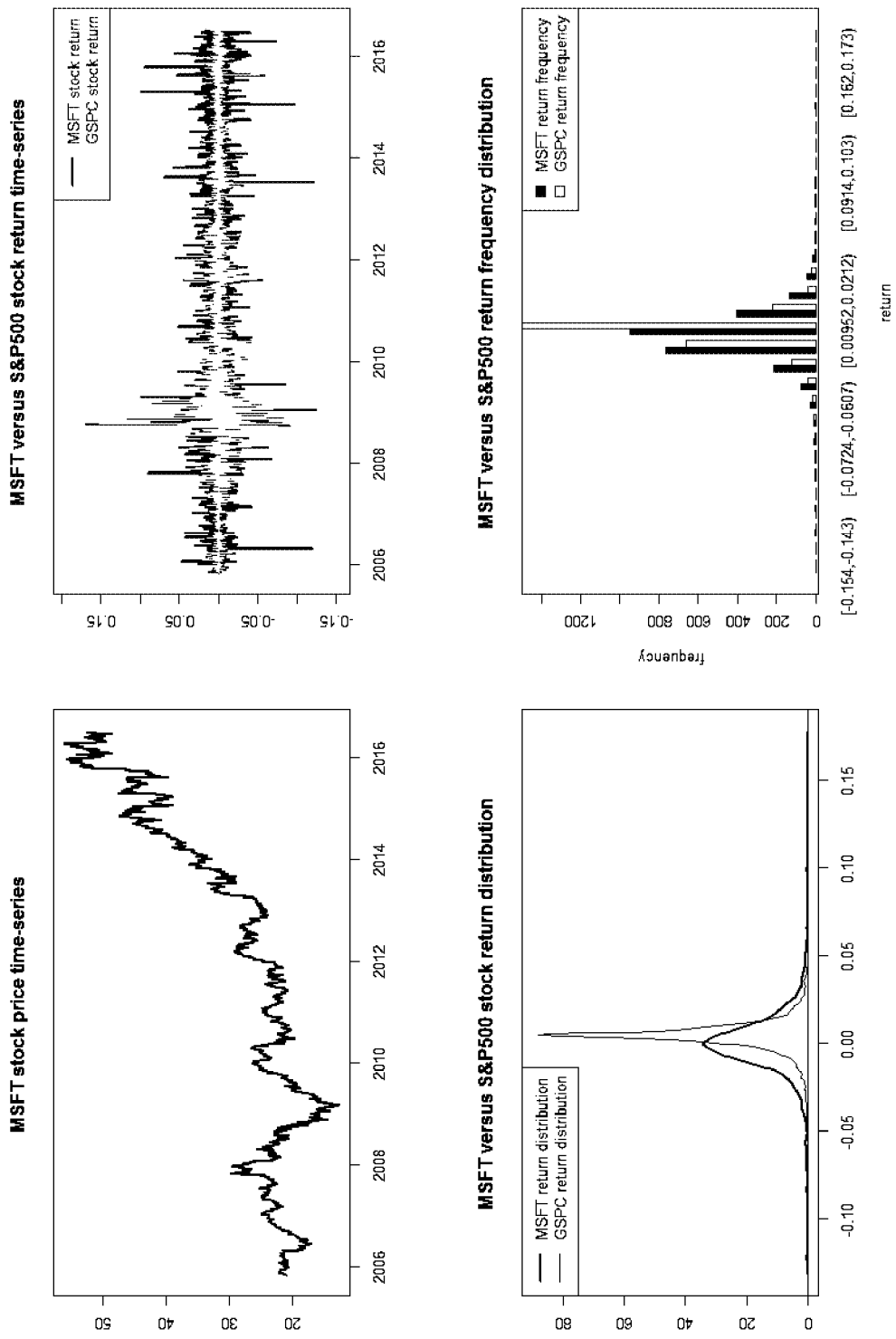
FIG. 5 illustrates the quadripartite visualization of exploratory analysis of the common stock of Microsoft Corporation (MSFT)
Figure 6:
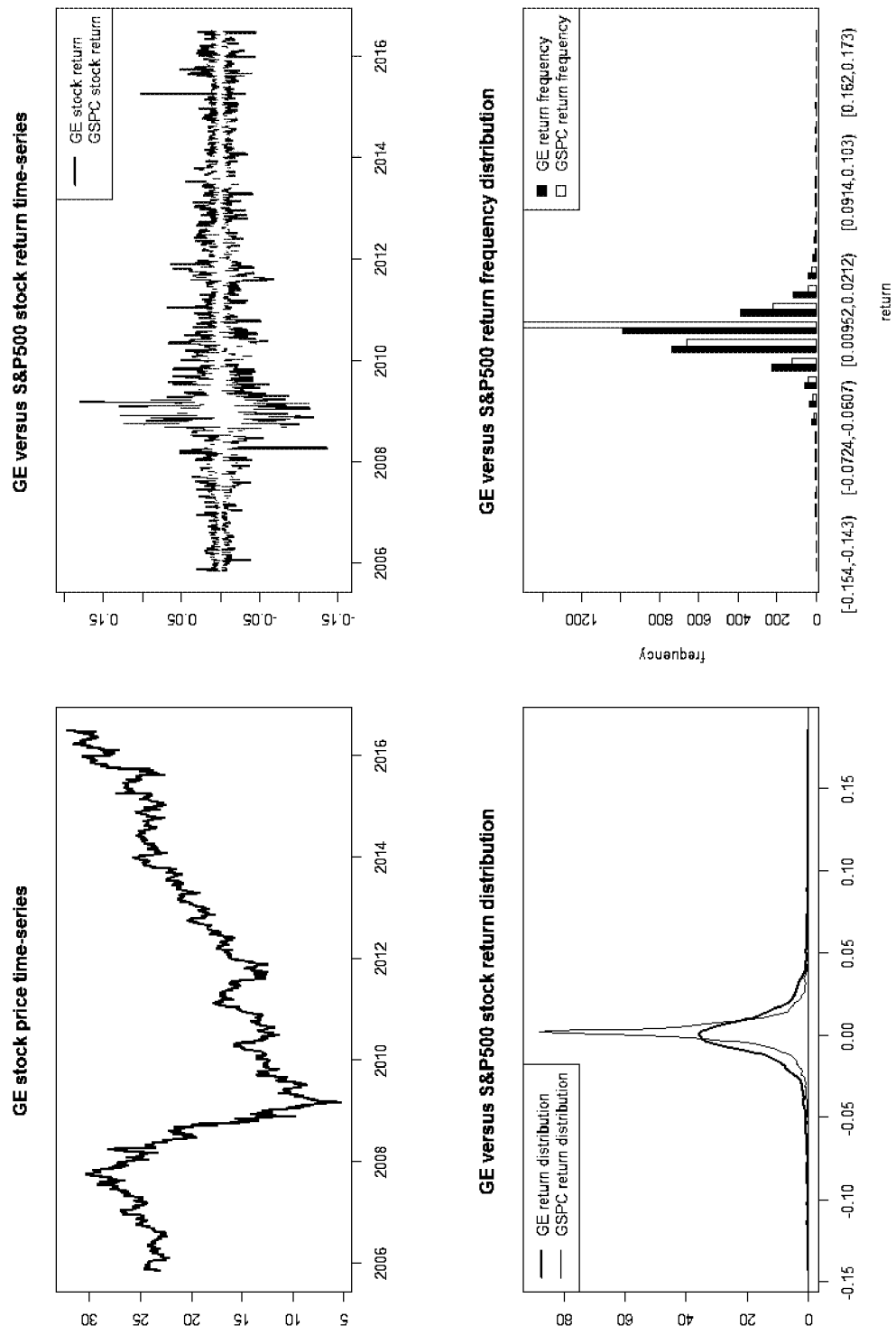
FIG. 6 illustrates the quadripartite visualization of exploratory analysis of the common stock of General Electric Company (GE)
Figure 7:
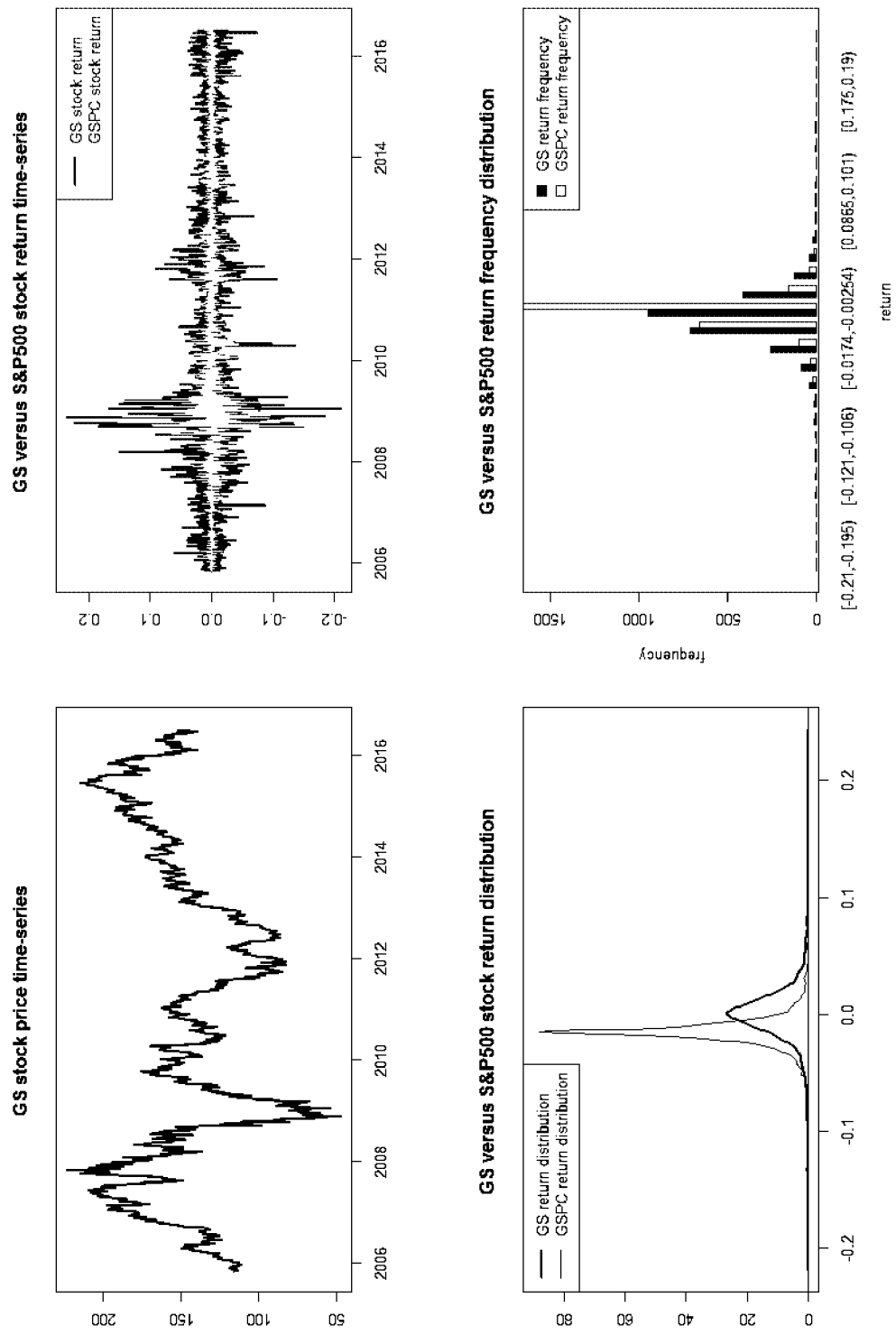
FIG. 7 illustrates the quadripartite visualization of exploratory analysis of the common stock of Goldman Sachs Group Inc. (GS)
Figure 8:
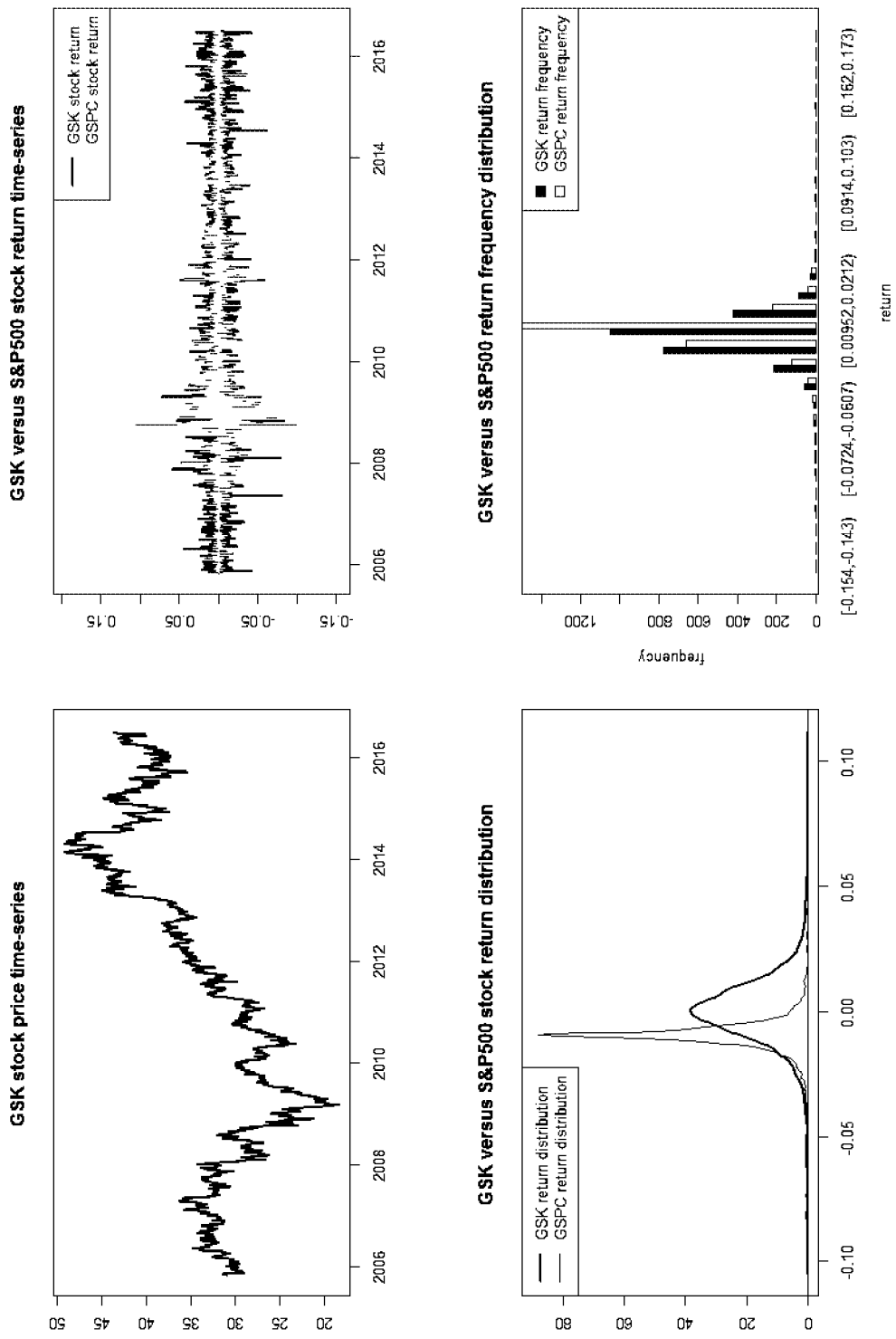
FIG. 8 illustrates the quadripartite visualization of exploratory analysis of the common stock of GlaxoSmithKiine plc (GSK)
Figure 9:
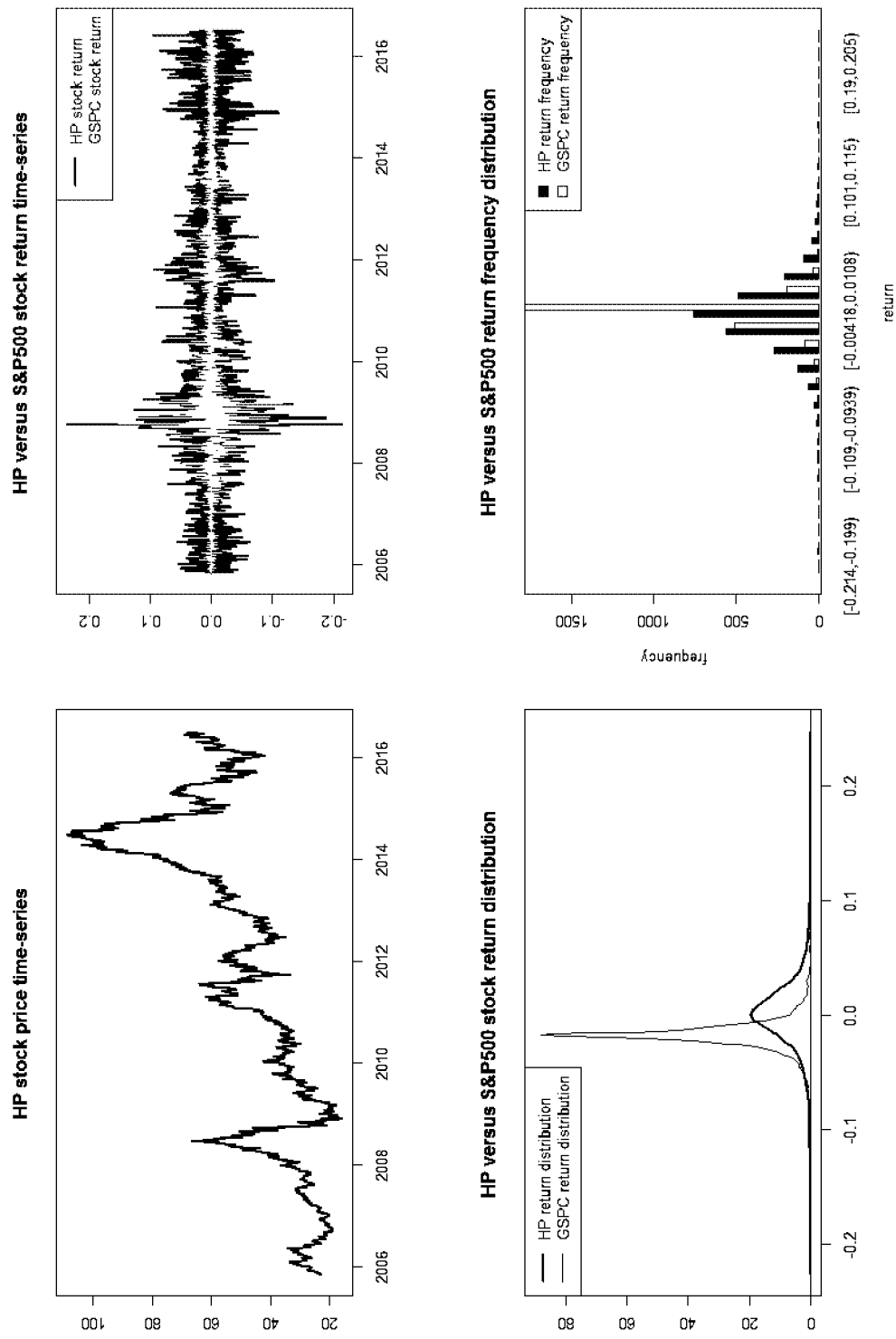
FIG. 9 illustrates the quadripartite visualization of exploratory analysis of the common stock of Helmerich & Payne, Inc. (HP)
Figure 10:
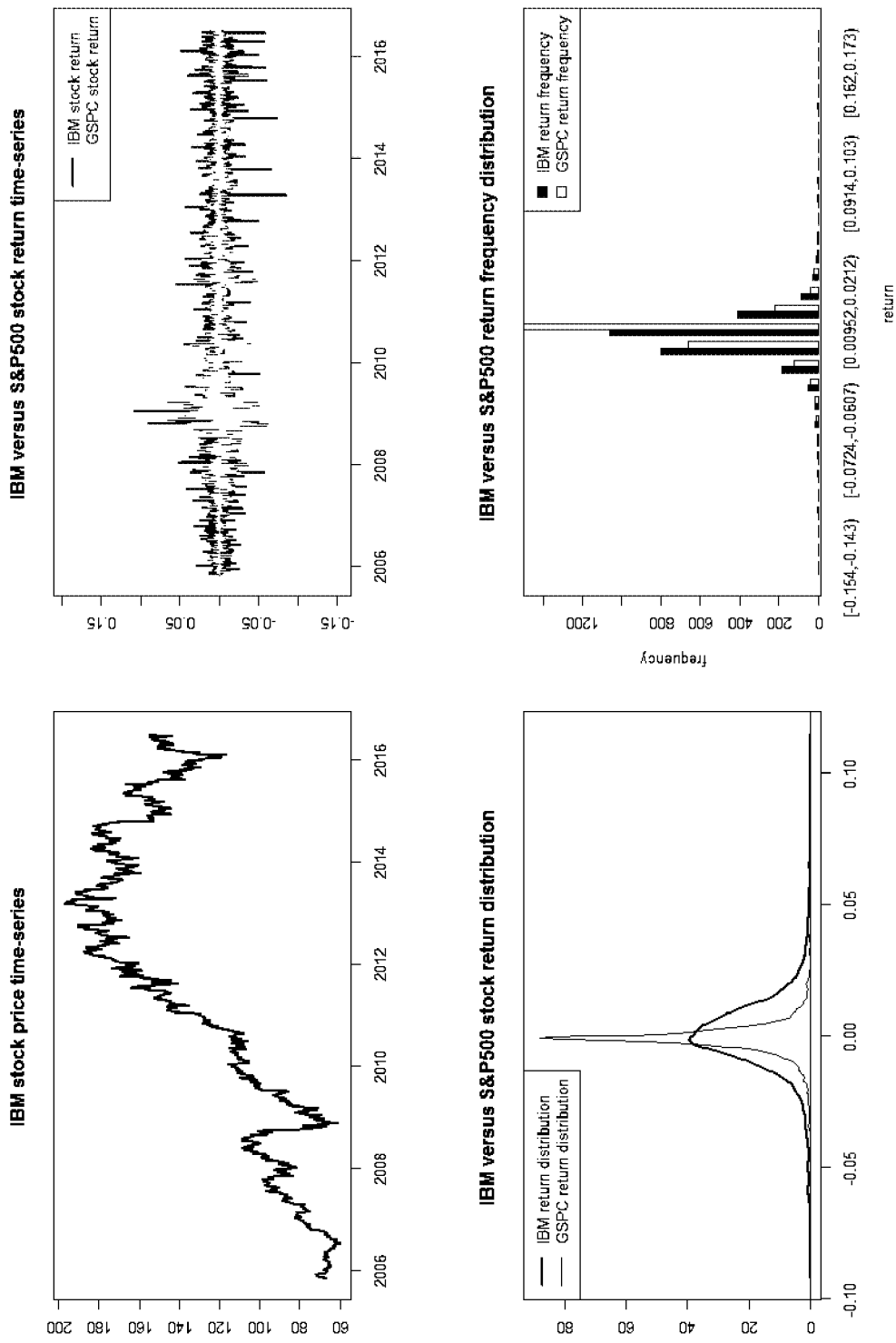
FIG. 10 illustrates the quadripartite visualization of exploratory analysis of the common stock of International Business Machines Corporation (IBM)
Figure 11:
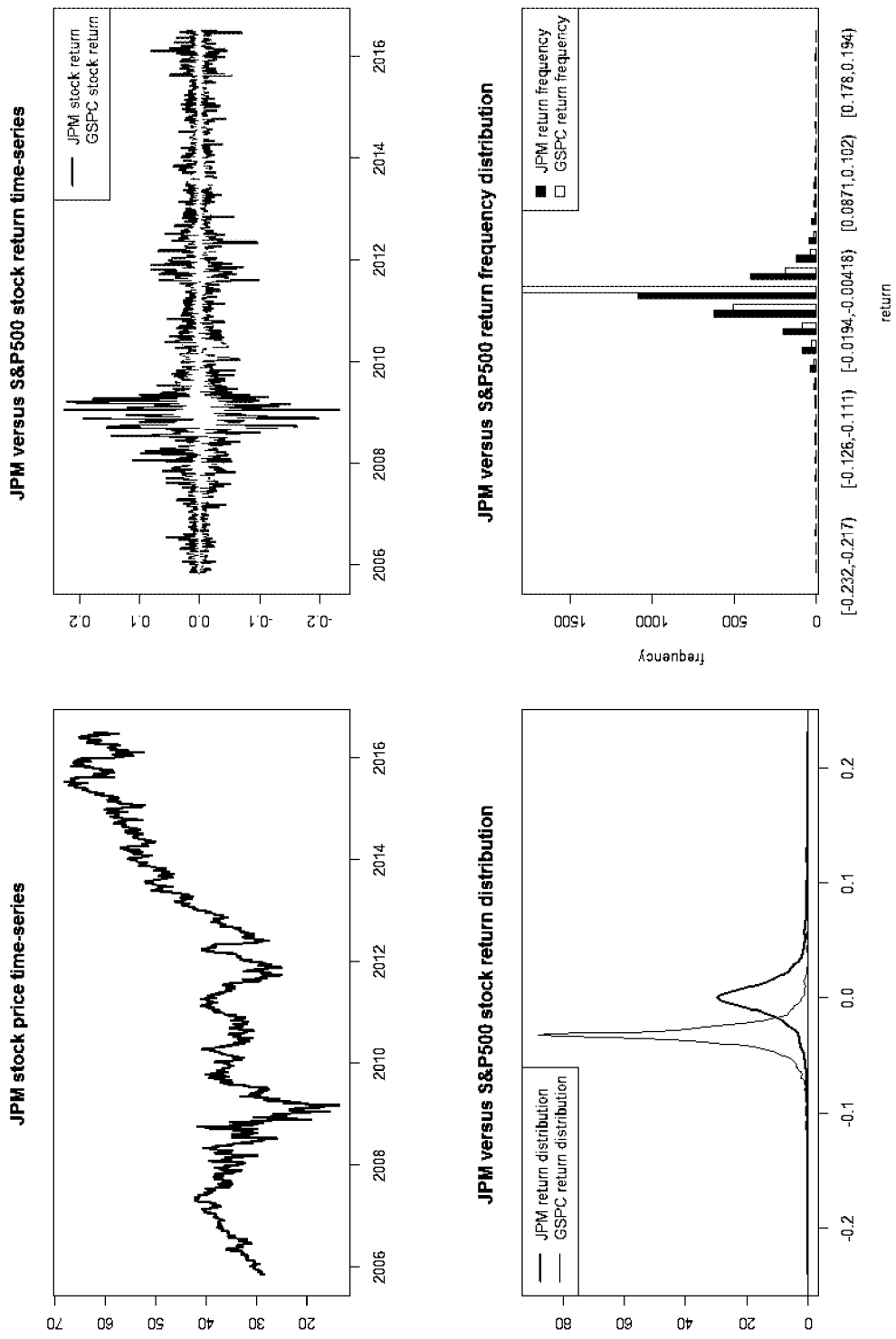
FIG. 11 illustrates the quadripartite visualization of exploratory analysis of the common stock of JPMorgan Chase & Co. (JPM)
Figure 12:
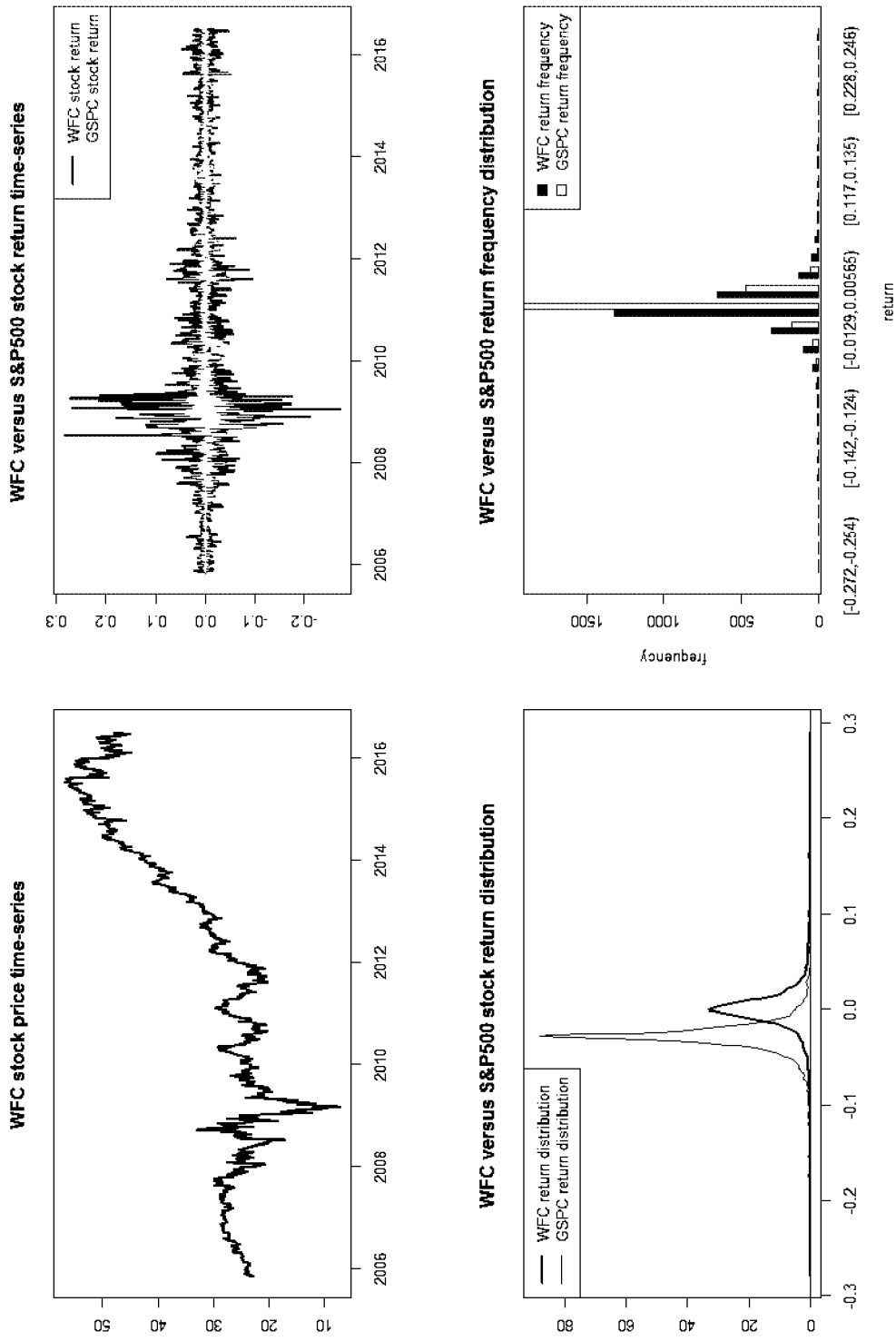
FIG. 12 illustrates the quadripartite visualization of exploratory analysis of the common stock of Wells Fargo & Co (WFC)

We now consider FIG. 3 to FIG. 12. FIG. 3 to FIG. 12 illustrate the quadripartite visualization of our exploratory analysis of each individual stock. FIG. 3 shows the quadripartite visualization of our exploratory analysis of the common stock of Cornerstone Total Return Fund, Inc. (NYSE: CRF). FIG. 4 shows the quadripartite visualization of our exploratory analysis of the common stock of Alphabet Inc. (NASDAQ: GOOGL). FIG. 5 displays the quadripartite visualization of our exploratory analysis of the common stock of Microsoft Corporation (NASDAQ: MSFT). FIG. 6 presents the quadripartite visualization of our exploratory analysis of the common stock of General Electric Company (NYSE: GE). FIG. 7 shows the quadripartite visualization of our exploratory analysis of the common stock of Goldman Sachs Group Inc. (NYSE: GS). FIG. 8 illustrates the quadripartite visualization of our exploratory analysis of the common stock of GlaxoSmithKline plc (NYSE: GSK). FIG. 9 illustrates the quadripartite visualization of our exploratory analysis of the common stock of Helmerich & Payne, Inc. (NYSE: HP). FIG. 10 depicts the quadripartite visualization of our exploratory analysis of the common stock of International Business Machines Corporation (NYSE: IBM). FIG. 11 demonstrates the quadripartite visualization of an exploratory analysis of the common stock of JPMorgan Chase & Co. (NYSE: JPM). FIG. 12 depicts the quadripartite visualization of our exploratory analysis of the common stock of Wells Fargo & Co (NYSE: WFC). The top-left chart of each of FIG. 3 to FIG. 12 shows the stock price time series after the econometrician adjusts the daily close prices for stock splits and dividends. The top-right chart of each of FIG. 3 to FIG. 12 shows the return time-series for the individual stock versus S&P 500. The bottom-left chart of each of FIG. 3 to FIG. 12 depicts the empirical return distributions for the individual stock versus S&P 500. Finally, the bottom-right chart of each of FIG. 3 to FIG. 12 juxtaposes the empirical return frequencies for the stock and S&P 500. While some individual stocks occasionally outperform or underperform the S&P 500 market index, the empirical stock return distributions exhibit sensible central tendency in different non-overlapping time horizons. On balance, each individual stock exhibits much more daily return variance around the central tendency of S&P 500 daily returns. Our key exploratory analysis suggests that the typical investor should form his or her own risky asset portfolio from a broad array of individual stocks to reap abundant diversification benefits.

FIG. 13 tabulates the descriptive statistics for SLB1, FF3, FFC4, FF5, FFC6, BRIDE6 alpha estimates, mean excess returns, standard deviations, Sharpe ratios, and conditional specification $\chi^2$ test statistics. All the static and dynamic conditional alphas carry negative median and mean values. Both the mean excess returns and Sharpe ratios shift from negative to positive near the 35$^{th}$ percentile. The individual stocks produce rather small average Sharpe ratios in the narrow range of −0.0244 to +0.030. For better diversification benefits, the typical investor may need to form portfolios with a wide array of individual stocks to substantially boost the overall Sharpe ratio. In regard to the dynamic conditional specification test, the critical value for 90% statistical confidence is 12.02 with 7 degrees of freedom. Hence, we observe from FIG. 13 that more than 62% of the 5,625 U.S. individual stocks exhibit sufficient evidence for the econometrician to reject the null hypothesis of a correct static multifactor asset pricing model. This preponderance of conditional specification test rejection supports the alternative use of the dynamic conditional asset pricing model that turns out to be the clear victor in our subsequent empirical analysis.

When we rank the 5,625 U.S. individual stocks by their respective dynamic conditional alphas, the Top 500 stock portfolio generates a 41% arithmetic average excess return while the Top 100 stock portfolio yields a hefty 84% average excess return. These annual mean excess returns are impressive for the typical investor who retains an active interest in the long-run prospect of the representative basket of top-notch U.S. stocks that significantly outperform most conventional market benchmarks.

FIG. 14 tabulates the core empirical evidence of the static and dynamic conditional alphas. We first rank the 5,625 individual stocks in accordance with their static or dynamic conditional alphas. Each rank order thus results in stock deciles for each of the static or dynamic conditional alpha strategies (SLB1, FF3, FFC4, FF5, FFC6, and BRIDE6). Then we compute the market-value-weighted average portfolio returns to each alpha strategy. While the dynamic conditional asset pricing model produces positive average excess returns in 9 of the stock deciles, the static counterparts generate positive average excess returns in only 7 of the stock deciles. Therefore, we deduce from FIG. 14 that the dynamic conditional asset pricing model yields positive long-run average excess returns at least 90% of the time, whereas, the static alternative counterparts generate positive long-term average excess returns with a rather thin 70% chance. In addition, we compute the arithmetic average values of market-value-weighted average returns across all of the deciles. While the static model results range between 2% to 4%, the dynamic conditional model yields a hefty 10.3% long-term average excess return across the complete spectrum of U.S. individual stocks.

We are interested in the how accurately each static or dynamic alpha model predicts the binary occurrence of individual stock returns in the top quantile. Since it is difficult to reach unanimous consensus on what constitutes the top quantile, we define it as the complete spectrum of the top percentile to the top quintile (i.e. the top 1% to the top 20%). Then we seek to gauge the relative magnitude of improvement in model accuracy over baseline concordance. The former indicates how accurately each static or dynamic alpha model ranks individual stocks from the best long-term average return prospect to the worst long-term average return prospect, whereas, the latter reflects how well each alpha model predicts the binary probabilistic concordance of stock return realization in the top group. The static and dynamic conditional alpha models both yield similar statistics for simple and intuitive model selection. These statistics are reasonably close residual deviances, Akaike information criteria, 80%+ accuracy ratios, and 75%+ concordance ratios.

FIG. 15 tabulates the evidence of alpha model improvements from the top percentile to the top quintile. The static asset pricing models exhibit some occasional improvement and deterioration in relative accuracy across the full range of top quantiles. Specifically, there is neither consistent nor significant improvements in relative accuracy because the top-quantile ratios of static model accuracy to baseline concordance hover around unity. In stark contrast, the dynamic conditional model demonstrates consistent improvements in relative accuracy from 2% to 8%. This central evidence suggests that the dynamic conditional alpha model outperforms the static counterparts in terms of key consistent improvements in relative model accuracy. Not only does the dynamic conditional model generate better alpha rank order that leads to higher long-term average excess returns with 90% statistical confidence, but this dynamic conditional alpha model is also more accurate than the static alternatives in predicting the binary likelihood of top return performance.

Our next step is to determine how accurately the dynamic conditional alphas explain the cross-sectional variation in the FFC6 static alphas, the long-term average excess returns, the standard deviations of individual stock returns, and the Sharpe ratios of long-term average excess returns to standard deviations. While there is no discernible empirical association between the dynamic conditional alphas and the respective standard deviations, the dynamic conditional alphas seem to account for a fairly large fraction of the cross-sectional variation in the other return quantities. Specifically, the dynamic conditional alphas explain up to 71% of the cross-sectional variation in long-term average excess returns. Ceteris paribus, each 10% increase in the average dynamic conditional alpha significantly correlates with a 7.7% increase in the long-term average excess return. This result resonates with the prior empirical evidence of key dynamic conditional alpha model outperformance.

Figure 16:
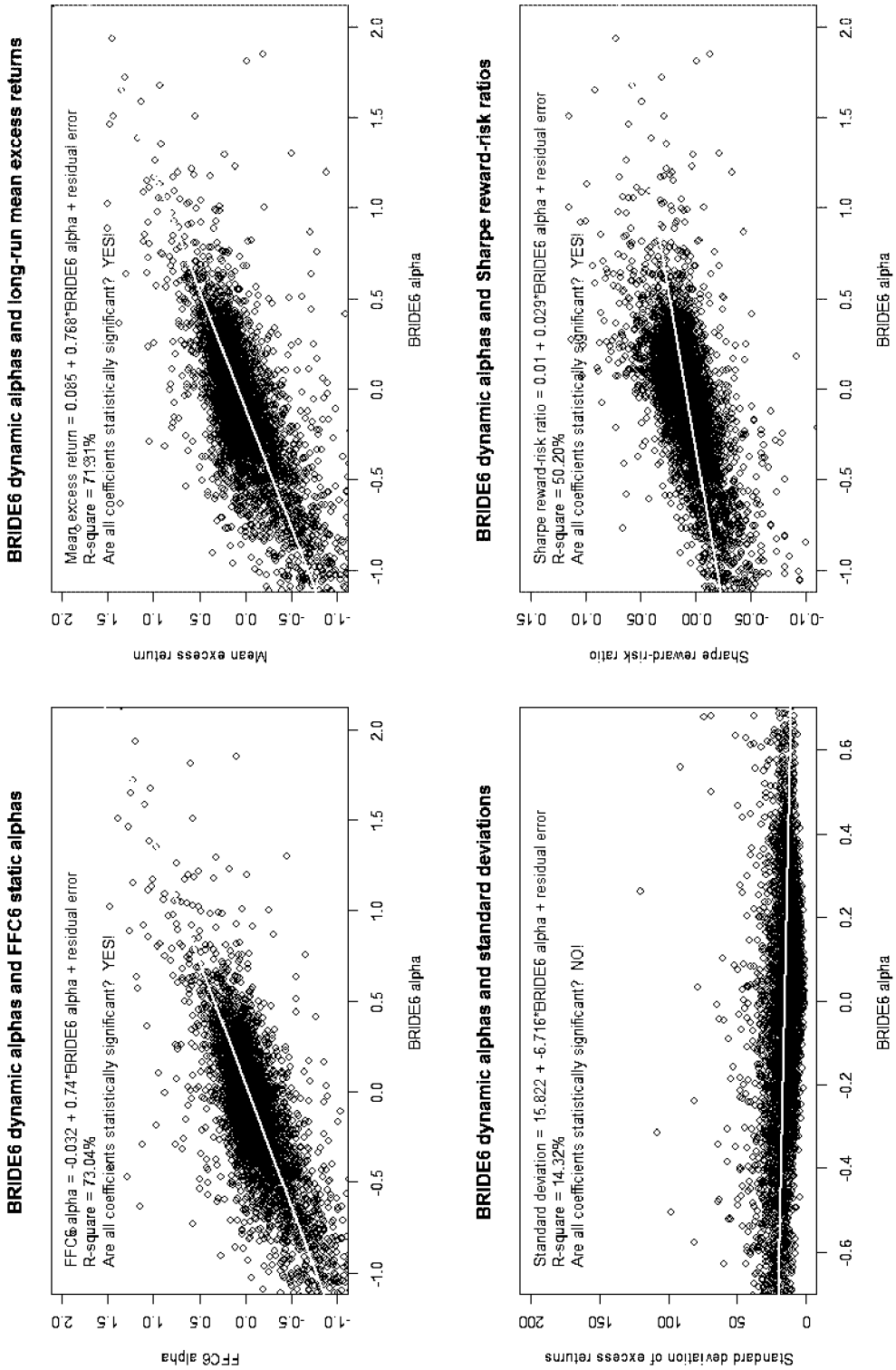
FIG. 16 illustrates the quadripartite visualization of BRIDE6 dynamic conditional alphas.

FIG. 16 shows a quadripartite visualization of BRIDE6 dynamic conditional alphas. The top-left chart of FIG. 16 displays the relationship between the BRIDE6 dynamic alpha and the FFC6 static alpha. The top-right chart of FIG. 16 illustrates the relation between the BRIDE6 dynamic alphas and the long-term average excess returns. The bottom-left chart of FIG. 16 demonstrates the relationship between the BRIDE6 dynamic alpha and the standard deviation. The bottom-right chart of FIG. 16 depicts the relation between the BRIDE6 dynamic alpha and the Sharpe reward-risk ratio. In FIG. 16, the dynamic conditional alphas capture at least half of the cross-sectional variation in the Sharpe ratios for individual stocks. At the disaggregate level, these results lend credence to the use of dynamic conditional alphas for the econometrician to "rank" individual stocks in terms of their relative return performance. On average, a 10% increase in the dynamic conditional alpha significantly correlates with a typical increase in the Sharpe ratio of about 0.3. This hefty boost is close to the equivalent Sharpe ratio for most conventional U.S. market indices (Novy-Marx, 2006; Fama and French, 2008, 2015). Thus, the Sharpe ratio liftoff is substantial when the typical investor moves from a conventional basket of individual stocks with low dynamic conditional alphas to another basket of individual stocks with higher dynamic conditional alphas. When we focus on the U.S. individual stocks with the Top 500 and Top 100 dynamic conditional alphas, the respective arithmetic average excess return are 41% and 84%. These figures exceed any reasonable market portfolio returns by a substantial margin of safety.

This quantitative example suggests that the dynamic conditional alpha model 111 outperforms the static counterparts 151 in many ways. First, the conditional specification test rejects the null hypothesis of correct static asset pricing models for more than 60% of the 5,625 U.S. individual stocks. In this regard, these static models arise as special cases of the dynamic conditional asset pricing model. Second, the dynamic conditional alpha model better predicts the superior excess returns than the static alternatives. Specifically, the Top 500 dynamic conditional alphas predict the 41% portfolio average excess return while the Top 100 dynamic conditional alphas predict the hefty 84% portfolio average excess return. Furthermore, the dynamic conditional alpha rank order yields positive long-term average excess returns with at least 90% statistical confidence, whereas, the static alpha rank order produces positive long-run average excess returns only 70% of the time (cf. FIG. 14). Third, the dynamic conditional multifactor asset pricing model better improves relative model accuracy in comparison to baseline concordance in binary top-quantile stock return prediction (cf. FIG. 15). Finally, the dynamic conditional alphas explain up to 71% of the cross-sectional variation in the long-term mean excess returns and Sharpe ratios for U.S. individual stocks (cf. FIG. 16). Not only does this empirical analysis recommend the dynamic conditional multifactor model as a superior stock-screening instrument in contrast to the static alternatives, but this analysis also proposes the dynamic conditional model for better long-term stock return prediction (cf. FIG. 13 to FIG. 16).

Example #2: An Empirical Analysis of Conditional Alphas for Monthly Returns on International Risky Portfolios of Stocks, Bonds, Currencies, and Commodities We empirically analyze the monthly returns on risky assets such as international stocks, bonds, currencies, and commodities. In this example, we use the recursive multivariate filter to extract dynamic conditional alphas from monthly returns on international stocks, bonds, commodities, and currencies. We make use of the international stock, bond, currency, and commodity Value-and-Momentum-Everywhere (VME) portfolio data from Asness, Moskowitz, and Pedersen's (2013) recent data library. We update and merge this global monthly portfolio dataset with the Fama-French-Carhart factor database. The resultant data span runs from January 1972 to June 2016. For our pragmatic purposes, we implement the dynamic conditional specification test to assess whether this test rejects the null hypothesis of a correct static model specification in favor of the alternative dynamic conditional multifactor asset pricing model across most of the value-and-momentum portfolios for international stocks, bonds, currencies, and commodities.

FIG. 17 summarizes the descriptive statistics for the Value-and-Momentum-Everywhere (VME) and Fama-French-Carhart (FFC) monthly portfolio returns. While all the VME and FFC risky portfolio returns exhibit negative skewness and leptokurtosis, the vast majority of these value-and-momentum portfolios offer positive mean and median returns. Most of the top deciles offer mean returns above 40%+ per annum and thus accord with the prior empirical analysis of U.S. individual stocks. Most of the VME and FFC asset portfolios provide Sharpe reward-risk ratios above 0.11 on average. So these global asset portfolios help the typical investor reap substantial diversification benefits in the form of much higher Sharpe ratios (in contrast to the Sharpe ratios for U.S. individual stocks in FIG. 13).

All of the 22 VME international asset portfolios carry equally-weighted average excess returns. Asness, Moskowitz, and Pedersen (2013) provide the full description of each portfolio database:

1. VME1 denotes the value portfolio for all international stocks, bonds, currencies, and futures;
2. VME2 is the momentum portfolio for all international stocks, bonds, currencies, and futures;
3. VME3 denotes the value portfolio for all international stocks;
4. VME4 is the momentum portfolio for all international stocks;
5. VME5 denotes the value portfolio for all international non-stock assets;
6. VME6 is the momentum portfolio for all international non-stock assets;
7. VME7 denotes the value portfolio for all U.S. stocks;
8. VME8 is the momentum portfolio for all U.S. stocks;
9. VME9 denotes the value portfolio for all U.K. stocks;
10. VME10 is the momentum portfolio for all U.K. stocks;
11. VME11 denotes the value portfolio for all European stocks;
12. VME12 is the momentum portfolio for all European stocks;
13. VME13 denotes the value portfolio for all Japanese stocks;
14. VME14 is the momentum portfolio for all Japanese stocks;
15. VME15 denotes the value portfolio for all global equity indices;
16. VME16 is the momentum portfolio for all global equity indices;
17. VME17 denotes the value portfolio for all global currencies;
18. VME18 is the momentum portfolio for all global currencies;
19. VME19 denotes the value portfolio for all global fixed-income bond instruments;
20. VME20 is the momentum portfolio for all global fixed-income bond instruments;
21. VME21 denotes the value portfolio for all global commodities; and
22. VME22 is the momentum portfolio for all global commodities.

Figure 18:
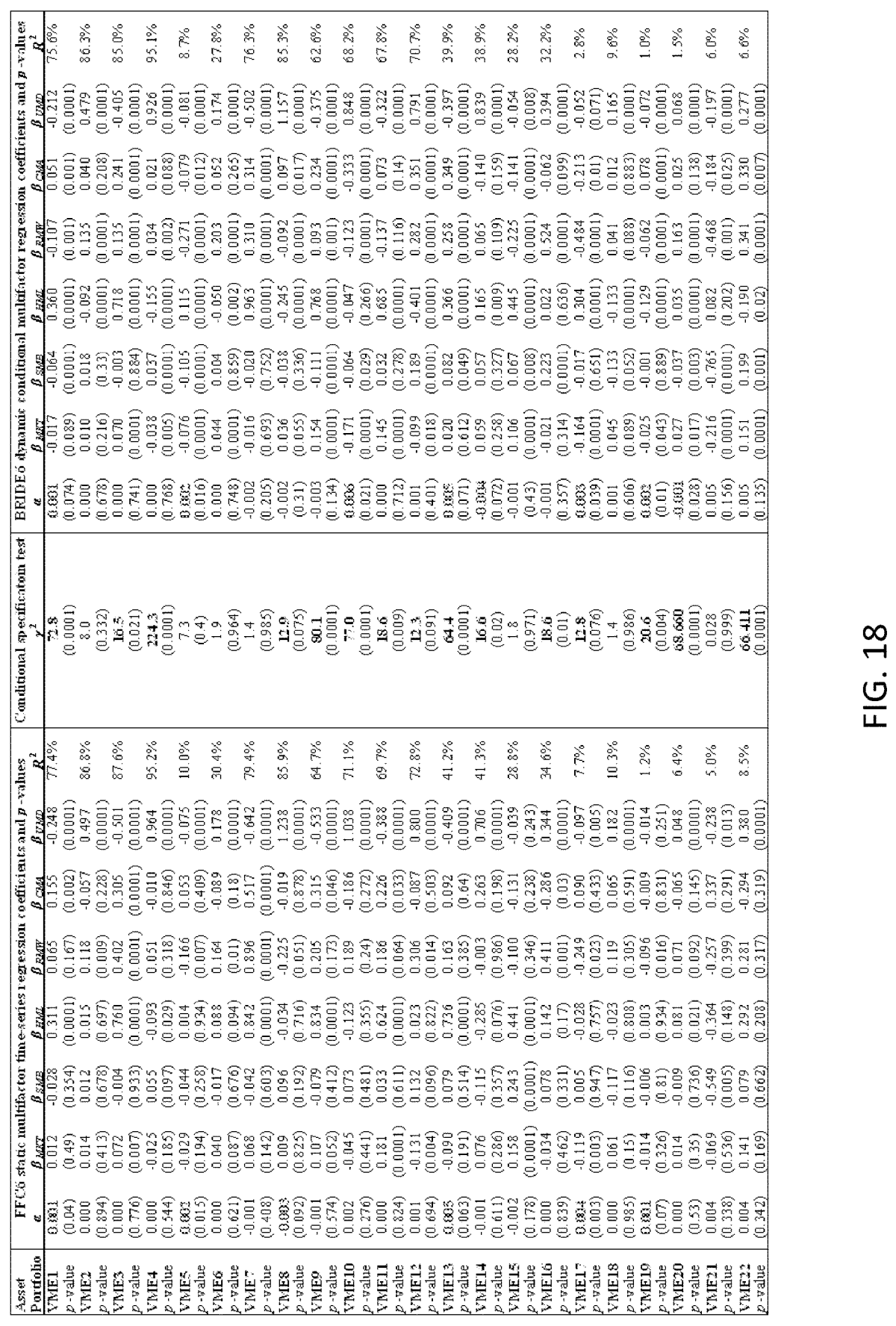

FIG. 18 tabulates the FFC6 static multifactor time-series regression results that the statistician juxtaposes with the BRIDE6 dynamic conditional model results. FIG. 18 shows that 14-16 out of the 22 static or dynamic conditional alphas are statistically insignificant with 90% statistical confidence. So the FFC6 static and BRIDE6 dynamic conditional multifactor models both yield reasonably small asset-pricing errors in the cross-section of 22 VME international stock, bond, currency, and commodity portfolios. These pricing errors are smaller than than 0.6% per month. Also, the conditional specification test rejects the null hypothesis of a correct static multifactor model in favor of the alternative dynamic conditional model for 15 of the 22 global risky asset portfolios. Although both the static and dynamic conditional multifactor models capture similar proportions of the variation in international portfolio returns, the conditional specification test indicates that the dynamic conditional model outperforms the static counterpart for most of the above international risky asset portfolios. Overall, the new and non-obvious technique can be readily generalized to a much broader array of international risky assets such as stocks, bonds, currencies, and commodities.

Algorithmic Financial Intelligence Technology Platform Automation

For this section, we refer to the topological architecture in FIG. 2 as an exemplary embodiment. This section describes and discusses the algorithmic design of financial intelligence technology platform automation. This automation allows end users to interact with one another via a rich and relevant set of financial intelligence such as dynamic conditional alpha rank order, financial ratio output, quadripartite visualization of financial information both over time and in the cross-section, and major financial statement analysis (balance sheet, income statement, and cash flow statement). This fintech platform automation further encourages valuable user interactions and information exchanges as most end users experience in an online social network. Each investor indicates his or her active interests, tastes, preferences, and investment styles via the graphical user interface with the most popular views, asset portfolios, and asset-specific dynamic alphas. This social network embeds individual status updates, posts, likes, unlikes, dislikes, comments, views, shares, tracks, tags, favorites, saves, invites, private messages, web traffic statistics, and so forth. In FIG. 2, this topological architecture automates the fintech platform through fast and stable cloud computing facilities for mobile web app design.

Each end user can register with his or her authentic profile from the readily available platforms (e.g. Facebook, Twitter, LinkedIn, YouTube, Google+, Pinterest, Reddit, Instagram, Flipboard, Tumblr, and personal email). This piggyback strategy allows multiple end users who currently surf on the other extant online platforms to gravitate toward the fintech platform 200 in FIG. 2. Several preliminary filters can identify each user's core asset investment styles such as portfolio tilts of size, value, momentum, asset investment growth, and operating profitability. The fintech platform may include an equivalent virtual intermediary or clearinghouse functionality. Upon his or her first-time registration, the equivalent virtual clearinghouse functionality allows each user to receive VP$1 million virtual portfolio points for the initial asset allocation. The fintech platform tracks and records each user's subsequent asset trade activities. The backend history helps update each end user's available virtual portfolio points to rank all active users who surf and trade on the platform. The backend network statistics help identify the Top 100 users who have gained the highest up-to-date virtual portfolio points (cf. marquee).

In FIG. 2, the algorithmic fintech platform 200 first imports asset-specific price, key financial ratio, and financial statement data from external cloud servers 211 and 221 to the internal cloud server 231. In this exemplary embodiment, the external cloud servers 211 and 221 can include Yahoo Finance, Google Finance, Reuters, FINVIZ, and so forth. The internal cloud server 231 processes the raw data to carry out the quantitative work for static ordinary least-squares (OLS) regression analysis and recursive multivariate dynamic conditional alpha and beta estimation. The algorithmic fintech platform 200 embeds the financial intelligence output module 210 on the internal cloud server 231. The financial intelligence output module 210 yields the dynamic conditional alpha rank order for the Top 500 stocks, bonds, currencies, and commodities. This financial intelligence output module 210 ultimately produces an executive summary of crucial quantitative information. This key financial intelligence includes the dynamic conditional alpha rank order, conditional specification test evidence, Sharpe reward-risk ratio computation, and some auxiliary financial information output.

Figure 19:
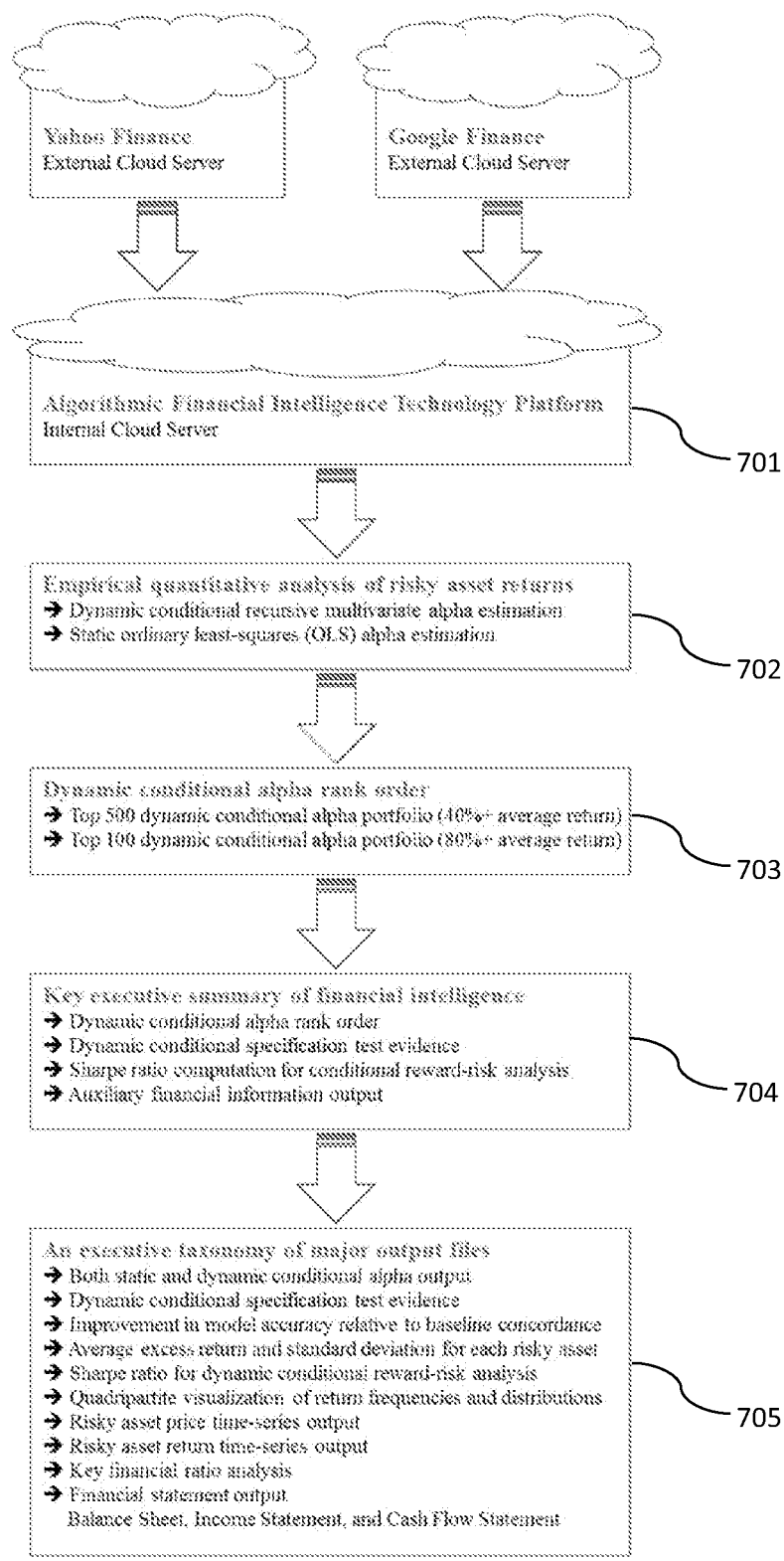
FIG. 19 depicts a mechanical flowchart of the dynamic conditional asset pricing system on the algorithmic fintech platform.

FIG. 19 illustrates the mechanical flow chart for algorithmic financial intelligence technology platform automation. At the initial step 701 of this flow chart, the algorithmic fintech platform 200 imports asset-specific price, key financial ratio, and financial statement data from external cloud servers 211 and 221 to the internal cloud server 231. In this exemplary embodiment, the external cloud servers 211 and 221 include Yahoo Finance, Google Finance, Reuters, FINVIZ, and so forth. At the second step 702, the dynamic conditional asset pricing system 100 processes the raw data to carry out the quantitative work for static ordinary least-squares (OLS) regression analysis and recursive multivariate dynamic conditional alpha and beta estimation. At the third step 703, the financial intelligence output module 210 in turn generates the dynamic conditional alpha rank order for the Top 500 individual stocks, bonds, currencies, and commodities. At the fourth step 704, the financial intelligence output module 210 exports an executive summary of all relevant and important financial intelligence and information. This information set includes the dynamic conditional alpha rank order, conditional specification test evidence, Sharpe ratio computation, and some auxiliary financial information. At the last step 705, the fintech platform sorts a useful checklist of core output files. These output files encompass the major items below:

1. Dynamic conditional alpha estimation and rank order;
2. Conditional specification test evidence;
3. Improvement in model accuracy relative to baseline concordance;
4. Average excess return and standard deviation for each individual risky asset;
5. Sharpe ratio for conditional reward-risk analysis;
6. Quadripartite visualization of asset return frequencies and distributions;
7. Asset price time-series output;
8. Asset return time-series output;
9. Key financial ratio output; and
10. Financial statement output (balance sheet, income statement, and cash flow statement).

Figure 20:
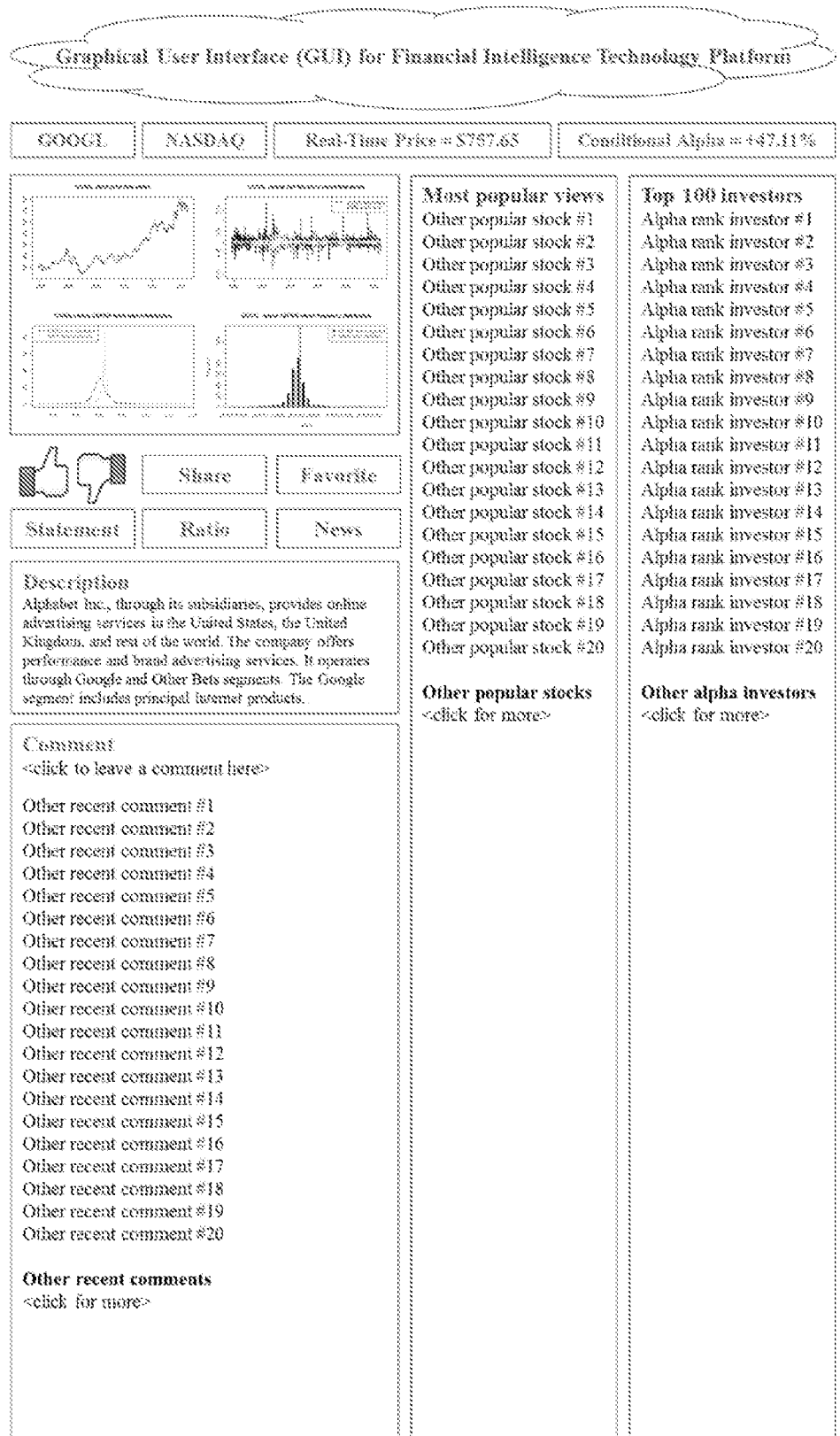
FIG. 20 illustrates the graphical user interface for algorithmic financial intelligence technology platform automation.

FIG. 20 illustrates the graphical user interface for algorithmic financial intelligence technology platform automation. On this interface, each user can see the ticker symbol, exchange, real-time price quote, and dynamic conditional alpha estimate for a given stock or some other risky asset. Then the quadripartite visualization shows the asset pricing time-series, the asset return versus S&P 500 return time-series, and the empirical distribution of individual asset return versus S&P 500 return frequencies. In FIG. 20, we choose the common stock of Alphabet Inc. as an example for illustration. Each end user can like, unlike, dislike, and share the executive summary on his or her personal platform webpage. Also, an additional option allows the user to add the asset-specific executive summary to his or her collection of favorite risky assets. Further, the platform interface allows the user to retrieve the financial statement output, key financial ratio summary, and external news about each risky asset. In addition to the brief asset description, the platform interface also provides an opportunity for each user to comment on the asset-specific executive summary. The other twin columns list the most popular views for those users who have recently viewed the particular risky asset, as well as the Top 100 end users who have achieved the highest up-to-date virtual portfolio points. Since each user can browse the asset trade histories of these Top 100 alpha investors, he or she can "learn" from the sequentially profitable asset investment strategies over time. Thereby, the Top 100 alpha investors engage in the progressive production and diffusion of valuable units of financial intelligence through their platform interactions and activities (cf. seed). It is important to add the caveat that each user can view the real-time asset price quote with proper adjustment for both stock splits and dividends.

Positive user feedback loops sift through the fintech platform 200 in FIG. 2. In addition to the Top 100 alpha users, another source of valuable units relates to the Top 500 U.S. stocks and the Top 500 global stocks, bonds, futures, currencies, indices, mutual funds, ETFs, and warrants with the highest dynamic conditional alphas. All this financial intelligence reveals and discloses alpha user activities, preferences, trades, status updates, asset investment styles, and so forth.

FIG. 21 depicts the graphical user interface for the Top 100 dynamic conditional alpha investor group. The interface shows the Top 100 users with the highest up-to-date virtual portfolio points on the fintech platform 200 in FIG. 2. The primary objective of this core modularity with several unique peripheral components is to establish the viral-growth ecosystem with spreadable value units such as dynamic conditional alpha estimates, quadripartite charts, Top 100 dynamic alpha users, as well as Top 500 U.S. and non-U.S. stocks, bonds, currencies, commodities, and so on. Peripheral components encompass the key financial ratio summaries, financial statements, asset price and return time-series, trade updates, and hyperlinks to external financial news websites about individual risky assets. This intelligence can be used in subsequent financial risk analysis.

Through fast and stable cloud computing facilities for mobile web app design and encryption, the current invention automates algorithmic fintech platform and dynamic conditional alpha estimation. With a highly modular and interactive social network, this fintech platform optimizes active-click mutual engagement among active users via both the centrifugal and centripetal user activities as well as the time-specific rank order of each active end user's asset portfolio value.

In accordance with the substantive spirit and content of the current invention, the algorithmic fintech platform seeks to help enhance the overall financial literacy and inclusion of the global general public via active-click mutual engagement (ACME). ACME rises exponentially when the highly modular algorithmic fintech platform boosts both centripetal and centrifugal end user interactions, improves individual users' dynamic conditional alpha ranks, and causes significant changes in structural characteristics such as demographic attributes, interests, behaviors, other platform usage patterns, and so forth. On this algorithmic fintech platform, each end user faces at least three different types of news feed customization: a user-experience module for Top 100 alpha investors or "superusers", an investment-style module for myriad "channels", and a social community module for multiple "groups". Each end user can switch from one newsfeed module to another from time to time in order to optimize his or her newsfeed customization. Specifically, the user-experience module allows each end user to "learn" from the recent asset trade histories of Top 100 alpha investors or "superusers"; the investment-style module offers many "channels" that segment individual users into risky asset portfolio tilts such as size, value, and momentum; the social-community module provides multiple "groups" that represent unique clusters on the basis of demographic attributes, interests, behaviors, and other platform usage patterns.

For a sufficiently long data span, the econometrician estimates active-click mutual engagement (ACME) as a Cobb-Douglas function of centripetal engagement (CPE), centrifugal engagement (CFE), market capitalization rank (MCR), and a wide variety of structural characteristics ($\xi$):

$$ACME = \xi \cdot CPE^\alpha \cdot CFE^\beta \cdot MCR^\gamma \qquad Eq.22$$

For the typical least-squares regression analysis, the econometrician can take the logarithmic form of Eq. 22 plus a random disturbance term:

$$\ln ACME = \ln \xi + \alpha \ln CPE + \beta \ln CFE + \gamma \ln MCR + \varepsilon \qquad Eq.23$$

It is plausible to express the joint effect of structural characteristics $\ln \xi$ as a linear combination of observable demographic attributes, interests, behaviors, and other platform usage patterns. Then the econometrician can derive the canonical panel regression equation with both user- and time-specific unobservable effects:

$$\ln ACME_{ht} = \sum_{k=1}^{K} \delta_{hk} x_{hk} + \alpha \ln CPE_{ht} + \beta \ln CFE_{ht} + \gamma \ln MCR_{ht} + u_h + \tau_t + \varepsilon_{ht} \qquad Eq.24$$

where ACME denotes the end user's up-to-date volume of active-click mutual engagement, x represents one of his or her observable structural characteristics, CPE denotes the user's unique volume of centripetal engagement, CFE is the user's unique volume of centrifugal engagement, MCR denotes the user's up-to-date market capitalization rank inside or outside the Top 100 list of alpha investors, u denotes the user's specific invariant effect in the cross-section, $\tau$ represents the user's specific invariant effect over time, $\varepsilon$ denotes the random error term (white noise), h denotes the $h^{th}$ end user, k represents the $k^{th}$ structural characteristic of the specific user or cross-sectional unit, and t is the time-specific subscript for a particular point in time. For pragmatic purposes, one applies Petersen's (2009) and Thompson's (2011) double-clustering user-quarter or user-month correction for robust standard errors. This "cluster-robust" correction requires at least double sequential steps. First, the statistician regresses the first differences $\Delta \ln ACME_{ht}$ on the first differences in all of the explanatory variables $\Delta x_{hk}$, $\Delta \ln CPE_{ht}$, $\Delta \ln CFE_{ht}$, $\Delta \ln MCR_{ht}$ to generate the residual error estimates. Second, the statistician estimates the asymptotic variance-covariance matrix for subsequent hypothesis test development:

$$A\hat{v}ar(\hat{\varphi}_{CRM}) = \left(\sum_{h=1}^{N}\sum_{t=1}^{T} \hat{z}_{ht}^T \hat{z}_{ht}\right)^{-1} \cdot \left(\sum_{h=1}^{N}\sum_{t=1}^{T}\sum_{s=1}^{T} \hat{e}_{hs} \hat{e}_{ht}^T \cdot \hat{z}_{ht}^T \hat{z}_{ht}\right) \cdot \left(\sum_{h=1}^{N}\sum_{t=1}^{T} \hat{z}_{ht}^T \hat{z}_{ht}\right)^{-1} \qquad Eq.25$$

where $\varphi_{CRM} = \{\delta^T \alpha \beta \gamma\}^T$ denotes the vector of time-invariant coefficients on the first differences in explanatory variables $z = \{\Delta x \; \Delta \ln CPE \; \Delta \ln CFE \; \Delta \ln MCR\}$ such as user-specific demographic attributes, interests, behaviors, and other platform usage patterns, and e represents the vector of residual errors from the prior first-differences regression. In essence, the statistician applies the resultant asymptotic variance-covariance matrix in Eq. 25 for subsequent hypothesis test design. A valid and reasonable hypothesis test helps examine whether the sum of factor shares equates unity ceteris paribus (i.e. $H_0$: $\alpha+\beta+\gamma=1$ and $H_A$: $\alpha+\beta+\gamma\neq1$ where the former $H_0$ denotes the null hypothesis and the latter $H_A$ denotes the alternative hypothesis). This analysis can empower the platform orchestrator to achieve effective ACME optimization when he or she enhances one or more unique aspects of fintech platform usage and automation through incremental increases in CPE, CFE, MCR, demographic attributes, interests, behaviors, other platform usage patterns, or user- and time-specific invariant effects.

For optimal fintech platform automation, the dynamic conditional asset pricing system creates standalone customer value for end users who have yet to engage in social network interactions on this algorithmic fintech platform. A broad plethora of social network functions that the prior section describes therein help stimulate both scalable usage and viral growth through effective digital marketing management. The backend platform orchestrator estimates, gauges, and then predicts active-click mutual engagement (ACME) by running periodic panel regression analysis with invariant user- and time-specific effects that correlate with any unobservable heterogeneity in the canonical form of Eq. 24. Through its periodic platform usage review cycle, this backend platform orchestrator strives to promote effective ACME optimization when he or she enhances one or more unique aspects of fintech platform usage and automation via incremental increases in CPE, CFE, MCR, demographic attributes, interests, behaviors, other platform usage patterns, and/or user- and time-specific invariant effects. In time, the fintech platform orchestrator needs to develop a useful and effective "curation strategy" to filter out any undesirable network results and patterns such as abusive usage and inappropriate content circulation.

The above embodiments are meant to only exemplify the current invention but not to limit the scope of the current invention. Thus, any equivalent modification or variation that accords with the principles set forth in the current invention is to be included within the scope of the invention.

What is claimed is:

1. An engagement-operated market prediction system connected by a network to a multiplicity of external cloud servers that are separate and distinct from the system, the system comprising:
   a database established in a server and configured to store financial records for at least one asset having a variable value, said financial records including retrieved asset specific financial data;
   an asset prediction subsystem coupled to said database, said asset prediction subsystem executing to generate at least one dynamic conditional model of the asset based on the financial records stored in the database, the dynamic conditional model being generated according to a plurality of predetermined fundamental factors based on the financial records, said asset prediction subsystem extracting dynamic conditional multifactor premiums from the dynamic conditional model and generating an asset return prediction based thereon, said asset prediction subsystem including a baseline static alpha and beta generation module for ordinary-least-squares (OLS) estimation of static single-factor and multi-factor premiums using at least a portion of said retrieved asset specific financial data;
   an output module coupled to said database and said asset prediction subsystem, said output module being configured to search and retrieve asset specific financial data from at least one of the multiplicity of external cloud servers and transfer said retrieved asset specific financial data to said database, said output module executing to reduce the financial records for the asset into an asset summary for export according to the asset return prediction therefor; and
   a social network interaction subsystem coupled to said database, said output module, and said asset prediction subsystem, said social network interaction subsystem maintaining a plurality of network-specific interfaces in adaptively selectable manner, each of said network-specific interfaces being configured for compatible interaction with a corresponding one of a plurality of differing external social networks, each of the plurality of external social networks being adapted to include at least one user associated therewith, each of the external social networks being configured to have an account profile for each user thereof, said social network interaction subsystem retrieving informational data from the user's social network account profile, and the retrieved informational data including demographic attributes of the user and interests thereof with respect to assets having variable values, the social network interaction subsystem being configured for each user to access the engagement-operated market prediction system through one of the external social networks to thereby interact with the social network interaction subsystem via an electronic computing device including at least a visual display unit and an input device, and responsive to said social network interaction subsystem determining that a user's social network account profile is incomplete, a corresponding electronic computing device's input device and visual display unit being configured by the social network interaction subsystem to receive informational data input by the user with respect to the user's demographic attributes and interests with respect to assets having variable values, said social network interaction subsystem also including a graphics processing unit for adaptively manipulating data to be displayed by the visual display unit of the electronic computing device of the user, said graphics processing unit of said social network interaction subsystem adaptively formatting a graphical user interface of a corresponding visual display unit of a respective electronic computing device through a selected one of the network-specific interfaces for two-way interaction with the respective user through the corresponding external social network, said social network interaction subsystem being configured to notify the user that the user's pre-existing account profile is incomplete by said graphics processing unit adaptively formatting the visual display unit of the user's electronic computing device, said social network interaction subsystem formatting the asset summary and user input from users of the social network received through the network-specific interface corresponding to the asset for storage in said database with the financial records for the asset, said graphics processing unit adaptively formatting a display of asset summary of a corresponding asset on the visual display unit of a corresponding user's electronic computing device responsive to at least one of the input provided by the user on the corresponding input device or the informational data including demographic attributes of the user and interests of the user with respect to assets, said social network interaction subsystem also including a virtual market module coupled to said graphics processing unit and being configured to record simulated transactions of at least one asset by users of the engagement-operated market prediction system through each network-specific interface, the simulated transactions included in the financial records for the corresponding asset stored in said database, each user conducting simulated transactions of the at least one asset via the respective visual display unit and input device, said virtual market module also being configured to generate an asset trade history of each user based on the user's recorded simulated transactions of each asset, said virtual market module being further configured to rank the plurality of users according to a simulated financial gain resulting from the simulated transactions and to generate a list of high-ranked users, said graphics processing unit selectively and adaptively formatting data associated with one of the following for display on a corresponding visual display unit of the user's electronic computing device: (1) asset trade histories of the users on the list of high-ranked users, (2) asset trade histories of other users having a similar asset trade history to that of the corresponding user, and (3) groups of other users having similar demographic attributes and interests with respect to assets having variable values, said social network interaction subsystem also including an interactivity module coupled to said graphics processing unit and configured to record the users interacting with one another and the users interacting with at least one asset through each network-specific interface, the user interactions including a provision of a user score of a corresponding asset, status updates by the users about a corresponding asset, private messages between the users about a corresponding asset, comments by the users about a corresponding asset, and likes, dislikes, and unlikes by the users about a corresponding asset, each user conducting the user interactions with one another and with the at least one asset on said social network interaction subsystem via the respective visual display unit and input device, the user interactions with one another and with the assets included in the financial records for the corresponding asset stored in said database, and said graphics processing unit configured to display within each network-specific interface by selectively and adaptively formatting the asset summary in combination with records of the user interactions with one another and with the asset for display on a corresponding visual display unit of a plurality of users accessing the engagement-operated market prediction system through multiple different external social networks.

2. The engagement-operated market prediction system of claim 1, wherein the predetermined fundamental factors include market risk, size, value, momentum, asset growth, and operating profitability.

3. The engagement-operated market prediction system of claim 1, wherein said asset prediction subsystem determines values for each of the predetermined fundamental factors according to an average return spread between a top 30% and a bottom 30% of individual assets according to a predetermined asset characteristic.

4. The engagement-operated market prediction system of claim 1, wherein:
the dynamic conditional model includes recursive filtration for dynamic conditional alpha and beta estimation based on primary financial records from the database, the primary financial records from the database including said retrieved asset specific financial data.

5. The engagement-operated market prediction system of claim 1, wherein said asset prediction subsystem includes an internal core statistical processing module for generalizing the dynamic conditional model to fit daily individual asset returns and monthly international asset portfolio returns.

6. The engagement-operated market prediction system of claim 1, wherein said asset prediction subsystem includes a multivariate filter operating on the dynamic conditional model to recursively determine the dynamic conditional factor premiums over a series of time increments.

7. The engagement-operated market prediction system of claim 1, wherein:
said asset prediction subsystem is further configured to generate at least one static asset model, and
said asset prediction subsystem includes a conditional specification test module configured to statistically distinguish dynamic conditional asset models from static asset models for individual risky assets or asset portfolios, said conditional specification test module generating $\chi^2$ test statistics and p-values for quantitative static or dynamic conditional asset model affirmation.

8. The engagement-operated market prediction system of claim 1, wherein said asset prediction subsystem includes a Sharpe ratio generation module for yielding an asset-specific ratio of average excess return to standard deviation of excess returns on the asset.

9. The engagement-operated market prediction system of claim 1, wherein the asset return prediction includes dynamic conditional alpha rank ordering.

10. A cloud-computing financial intelligence technology (fintech) platform connected by a network to a multiplicity of external cloud servers that are separate and distinct from the platform, and a plurality of mobile devices, the platform comprising:
a cloud-based server connected to the network and configured to search at least a portion of the multiplicity of external cloud servers for asset specific financial data and retrieving said asset specific financial data from at least a portion of the multiplicity of external cloud servers and providing two-way data transfer with the plurality of mobile devices;
a database established in said cloud-based server and configured to store financial records for at least one asset having a variable value, said financial records including said retrieved asset specific financial data;
an asset modeling subsystem coupled to said database, said asset modeling subsystem executing to generate at least one dynamic conditional model of the asset based on the financial records stored in the database, the dynamic conditional model generated according to values for a plurality of predetermined factors extracted from the financial records, said asset modeling subsystem determining dynamic conditional multifactor premiums from the dynamic conditional model and generating an asset return prediction based thereon;
an output module coupled to said database and said asset modeling subsystem, said output module executing to format a subset of financial records for the asset together with the asset return prediction therefor as an asset summary for export; and
a social network interface coupled to said database, said output module, and said asset modeling subsystem, said social network interface including a plurality of adaptively-selectable network-specific interfaces, each of said network-specific interfaces being configured for compatible interaction with a corresponding one of a plurality of differing external social networks, each of the plurality of differing external social networks being adapted to include at least one user associated therewith, each of the external social networks being configured to have an account profile for each user thereof, said social network interface retrieving informational data from the user's social network account profile, and the retrieved informational data including demographic attributes of the user and interests thereof with respect to assets having variable values, the social network interface being configured for each user to access the cloud-computing financial intelligence technology (fintech) platform through one of the differing external social networks to thereby interact with the social network interface via the mobile device, each mobile device including at least a visual display unit and an input device, and responsive to said social network interface determining that a user's social network account profile is incomplete, a corresponding mobile device's input device and visual display unit being configured by the social network interface to receive informational data input by the user with respect to the user's demographic attributes and interests with respect to assets having variable values, said social network interface also including a graphics processing unit for adaptively manipulating data to be displayed by the visual display unit of the mobile device of the user, said graphics processing unit of said social network interface adaptively formatting a graphical user interface of a corresponding visual display unit of a respective mobile device through a selected one of the network-specific interfaces for two-way interaction with the respective user through the corresponding external social network, said social network interface being configured to notify the user that the user's pre-existing account profile is incomplete by said graphics processing unit adaptively formatting the visual display unit of the user's mobile device, said social network interface interactively presenting the asset summary through a plurality of social network mobile applications executing on the plurality of mobile devices, the asset summary presented in a plurality of formats correspondingly adapted to the plurality of social network mobile applications, said graphics processing unit adaptively formatting a display of asset summary of a corresponding asset on the visual display unit of a corresponding user's mobile device according to the social network mobile application of the mobile device, and said graphics processing unit displaying the asset summary responsive to at least one of the input provided by the user on the corresponding input device or the informational data including demographic attributes of the user and interests of the user with respect to assets, said social network interface also including a virtual market module coupled to said graphics processing unit and being configured to record simulated transactions of at least one asset by the users of the cloud-computing financial intelligence technology (fintech) platform through each network-specific interface, the simulated transactions included in the financial records for the corresponding asset stored in said database, each user conducting simulated transactions of the at least one asset via the respective visual display unit and input device, said virtual market module also being configured to generate an asset trade history of each user based on the user's recorded simulated transactions of each asset, said virtual market module being further configured to rank the plurality of users according to a simulated financial gain resulting from the simulated transactions and to generate a list of high-ranked users, said graphics processing unit selectively and adaptively formatting data associated with one of the following for display on a corresponding visual display unit of the user's mobile device according to the social network mobile application of the mobile device: (1) asset trade histories of the users on the list of high-ranked users, (2) asset trade histories of other users having a similar asset trade history to that of the corresponding user, and (3) groups of other users having similar demographic attributes and interests with respect to assets having variable values, said social network interface formatting user interactions with the social network users received from each of the social network mobile applications corresponding to the asset for storage in the financial records for the asset in said database, wherein said social network interface includes an interactivity module coupled to said graphics processing unit and to the social network mobile applications of the mobile devices, said interactivity module configured to record the users interacting with one another through the respective social network mobile applications, said interactivity module also configured to record the users interacting with at least one asset through each network-specific interface and the corresponding social network mobile application, the user interactions including a provision of a user score of a corresponding asset, status updates by the users about a corresponding asset, private messages between the users about a corresponding asset, comments by the users about a corresponding asset, and likes, dislikes, and unlikes by the users about a corresponding asset, each user conducting the user interactions with one another and with the at least one asset on said social network interface through the corresponding social network mobile application via the respective visual display unit and input device, the user interactions with one another and with the assets included in the financial records for the corresponding asset stored in said database, and said graphics processing unit configured to display within each network-specific interface by selectively and adaptively formatting the asset summary in combination with records of the user interactions with one another and with the asset for display on a corresponding visual display unit of the respective user's mobile device of a plurality of users accessing the cloud-computing financial intelligence technology (fintech) platform through multiple different external social networks according to the social network mobile application of the mobile device.

11. The cloud-computing fintech platform of claim 10, wherein the predetermined factors include market risk, size, value, momentum, asset growth, and operating profitability.

12. The cloud-computing fintech platform of claim 10, wherein said asset modeling subsystem determines the values for each of the predetermined factors according to an average return spread between a top 30% and a bottom 30% of individual assets according to a predetermined asset characteristic.

13. The cloud-computing fintech platform of claim 10, wherein said asset modeling subsystem includes a multivariate filter operating on the dynamic conditional model to recursively determine the dynamic conditional factor premiums over a series of time increments.

14. The cloud-computing fintech platform of claim 10, wherein said asset modeling subsystem includes a Sharpe ratio generation module for yielding an asset-specific ratio of average excess return to standard deviation of excess returns on the asset.

15. An engagement-operated market prediction system connected by a network to a multiplicity of external cloud servers that are separate and distinct from the system, the system comprising:

a server connected to the network and configured to search at least a portion of the multiplicity of external cloud servers for asset specific financial data and retrieving said asset specific financial data from at least a portion of the multiplicity of external cloud servers and providing two-way data transfer with a plurality of electronic computer devices;

a database established in said server and configured to store financial records for at least one asset having a variable value, said financial records including said retrieved asset specific financial data;

an asset prediction subsystem coupled to said database, said asset prediction subsystem executing to generate at least one dynamic conditional model of the asset based on the financial records stored in the database, the dynamic conditional model generated according to a plurality of predetermined fundamental factors based on the financial records, said asset prediction subsystem recursively determining dynamic conditional multifactor premiums over a series of time increments based on the dynamic conditional model and generating an asset return prediction based thereon;

an output module coupled to said database and said asset prediction subsystem, said output module executing to reduce the financial records for the asset into an asset summary for export according to the asset return prediction therefor; and a social network interaction subsystem coupled to said database, said output module, and said asset prediction subsystem, said social network interaction subsystem maintaining a plurality of network-specific interfaces in adaptively selectable manner, each of said network-specific interfaces being configured for compatible interaction with a corresponding one of a plurality of differing external social networks, each of the plurality of external social networks being adapted to include at least one user associated therewith, each of the external social networks being configured to have an account profile for each user thereof, said social network interaction subsystem retrieving informational data from the user's social network account profile, and the retrieved informational data including demographic attributes of the user and interests thereof with respect to assets having variable values, the social network interaction subsystem being configured for each user to access the engagement-operated market prediction system through one of the external social networks to thereby interact with the social network interaction subsystem via the electronic computer device, the electronic computer device including at least a visual display unit and an input device, and responsive to said social network interaction subsystem determining that a user's social network account profile is incomplete, a corresponding electronic computer device's input device and visual display unit being configured by the social network interaction subsystem to receive informational data input by the user with respect to the user's demographic attributes and interests with respect to assets having variable values, said social network interaction subsystem also including a graphics processing unit for adaptively manipulating data to be displayed by the visual display unit of the electronic computer device of the user, said graphics processing unit of said social network interaction subsystem adaptively formatting a graphical user interface of a corresponding visual display unit of a respective electronic computer device through a selected one of the network-specific interfaces for two-way interaction with the respective user through the corresponding external social network, said social network interaction subsystem being configured to notify the user that the user's pre-existing account profile is incomplete by said graphics processing unit adaptively formatting the visual display unit of the user's electronic computer device, said social network interaction subsystem formatting the asset summary and user input from the users of the social network received through the network-specific interface corresponding to the asset for storage in said database with the financial records for the asset, said graphics processing unit adaptively formatting a display of asset summary of a corresponding asset on the visual display unit of a corresponding user's electronic computer device responsive to at least one of the input provided by the user on the corresponding input device or the informational data including demographic attributes of the user and interests of the user with respect to assets, said social network interaction subsystem also including a virtual market module coupled to said graphics processing unit and being configured to record simulated transactions of at least one asset by the users of the engagement-operated market prediction system through each network-specific interface, the simulated transactions included in the financial records for the corresponding asset stored in said database, each user conducting simulated transactions of the at least one asset via the respective visual display unit and input device, said virtual market module also being configured to generate an asset trade history of each user based on the user's recorded simulated transactions of each asset, said virtual market module being further configured to rank the plurality of users according to a simulated financial gain resulting from the simulated transactions and to generate a list of high-ranked users, said graphics processing unit selectively and adaptively formatting data associated with one of the following for display on a corresponding visual display unit of the user's electronic computer device: (1) asset trade histories of the users on the list of high-ranked users, (2) asset trade histories of other users having a similar asset trade history to that of the corresponding user, and (3) groups of other users having similar demographic attributes and interests with respect to assets having variable values, said social network interaction subsystem also including an interactivity module coupled to said graphics processing unit and configured to record the users interacting with one another and the users interacting with at least one asset through each network-specific interface, the user interactions including a provision of a user score of a corresponding asset, status updates by the users about a corresponding asset, private messages between the users about a corresponding asset, comments by the users about a corresponding asset, and likes, dislikes, and unlikes by the users about a corresponding asset, each user conducting the user interactions with one another and with the at least one asset on said social network interaction subsystem via the respective visual display unit and input device, the user interactions with one another and with the assets included in the financial records for the corresponding asset stored in said database, and said graphics processing unit configured to display within each network-specific interface by selectively and adaptively formatting the asset summary in combination with records of the user interactions with one another and with the asset for display on a corresponding visual display unit of a plurality of users accessing the engagement-operated market prediction system through multiple different external social networks.

16. The engagement-operated market prediction system of claim 15, wherein the predetermined fundamental factors include market risk, size, value, momentum, asset growth, and operating profitability, the values for each of the predetermined fundamental factors being determined according to an average return spread between a top 30% and a bottom 30% of individual assets according to a predetermined asset characteristic.

* * * * *